(12) United States Patent
Hyoki

(10) Patent No.: US 9,066,053 B1
(45) Date of Patent: Jun. 23, 2015

(54) IMAGE READING APPARATUS, AND IMAGE FORMING APPARATUS

(71) Applicant: FUJI XEROX CO., LTD., Tokyo (JP)

(72) Inventor: Kenji Hyoki, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/550,269

(22) Filed: Nov. 21, 2014

(51) Int. Cl.
*G03F 3/08* (2006.01)
*H04N 1/60* (2006.01)

(52) U.S. Cl.
CPC .................................. *H04N 1/6016* (2013.01)

(58) Field of Classification Search
CPC ..... H04N 1/6016; H04N 1/6033; H04N 1/52; H04N 1/6058; H04N 1/603; G06K 15/02
USPC .......................................... 358/1.1, 1.19, 518
See application file for complete search history.

(56) References Cited

U.S. PATENT DOCUMENTS

| | | | |
|---|---|---|---|
| 6,356,364 B2 * | 3/2002 | Matsushiro et al. | 358/1.9 |
| 7,692,818 B2 * | 4/2010 | Futami | 358/3.26 |
| 2008/0137107 A1 | 6/2008 | Futami | |
| 2011/0149357 A1 | 6/2011 | Utsunomiya | |

FOREIGN PATENT DOCUMENTS

| | | |
|---|---|---|
| JP | H06-105143 A | 4/1994 |
| JP | H11-220621 A | 8/1999 |
| JP | 2001-086333 A | 3/2001 |
| JP | 3283586 B2 | 5/2002 |
| JP | 3985985 B2 | 10/2007 |
| JP | 2008-147816 A | 6/2008 |
| JP | 2011-130232 A | 6/2011 |

* cited by examiner

*Primary Examiner* — Douglas Tran
(74) *Attorney, Agent, or Firm* — Oliff PLC

(57) ABSTRACT

Provided is an image reading apparatus, including an update unit that updates a color correction coefficient of an image read signal of an image read by a reading unit using a color reference surface provided with an achromatic color reference surface and a chromatic color reference surface, a first detection unit that detects existence of dust based on read information of the achromatic color reference surface, a second detection unit that detects existence of the dust based on the read information of the chromatic color reference surface, and a third detection unit that detects a type of an optical component onto which the dust is attached according to a detection result of the first detection unit and the second detection unit.

20 Claims, 16 Drawing Sheets

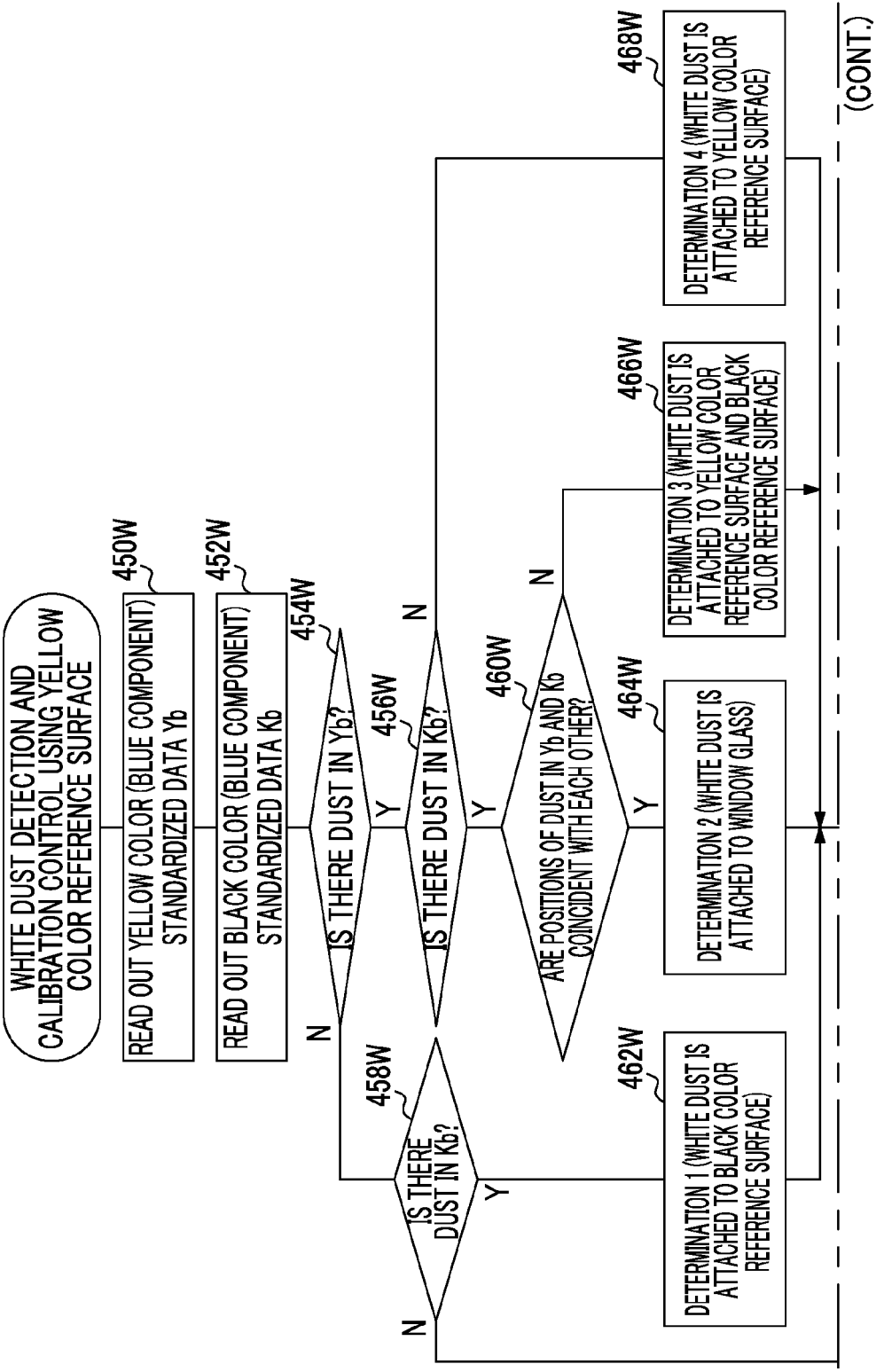

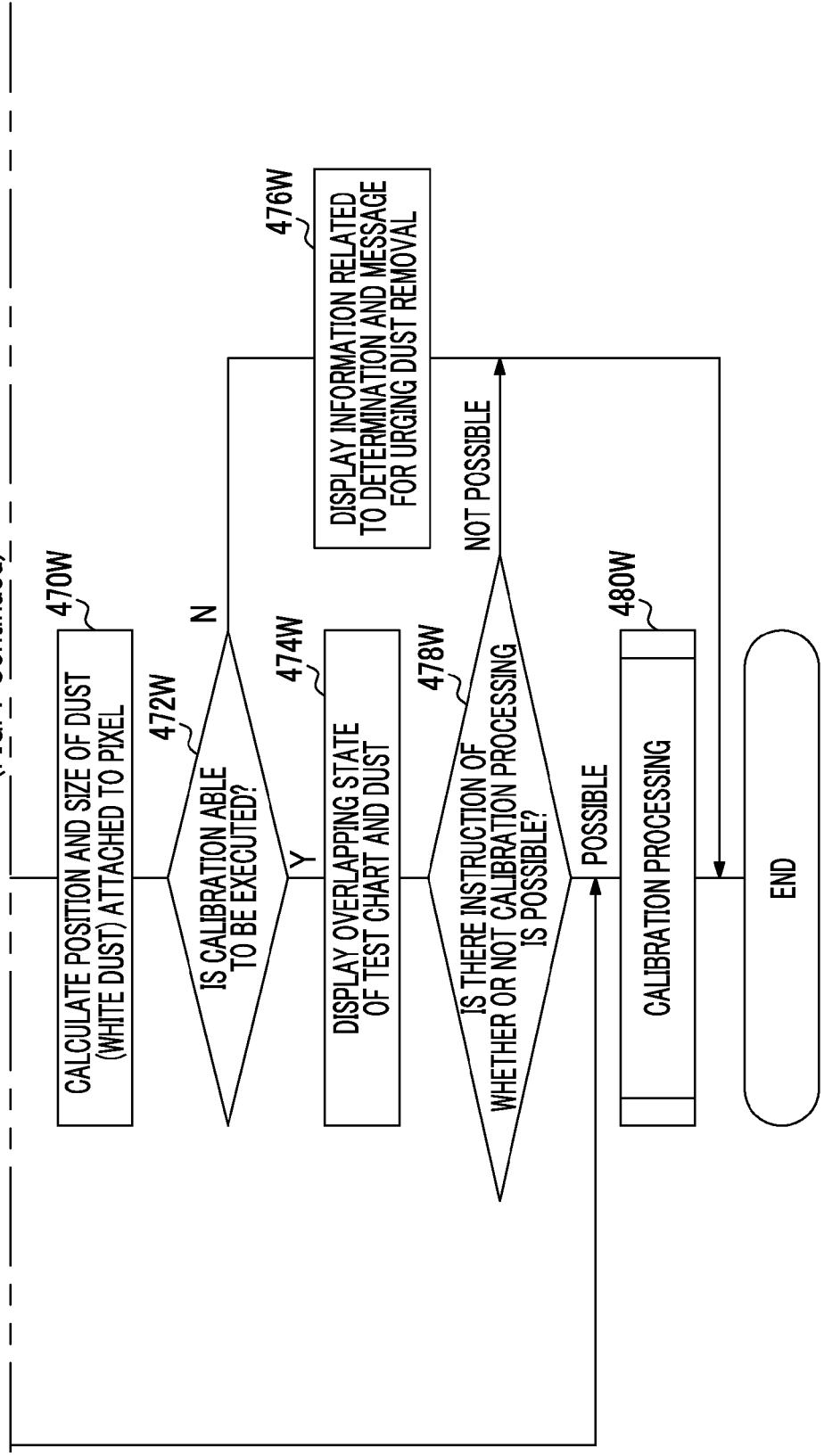

FIG. 8A
WHITE DUST ATTACHED PATTERN ON YELLOW COLOR REFERENCE SURFACE
(DETERMINATION 4 OF FIG. 7)
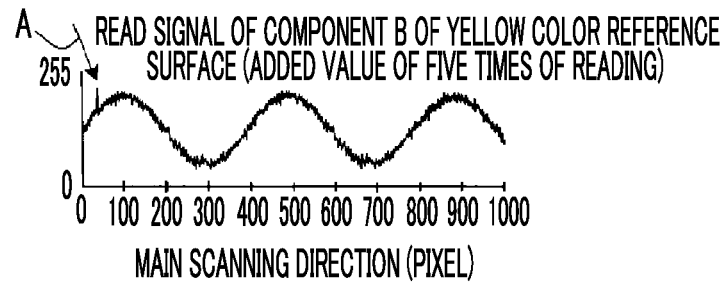
READ SIGNAL OF COMPONENT B OF YELLOW COLOR REFERENCE SURFACE (ADDED VALUE OF FIVE TIMES OF READING)
MAIN SCANNING DIRECTION (PIXEL)
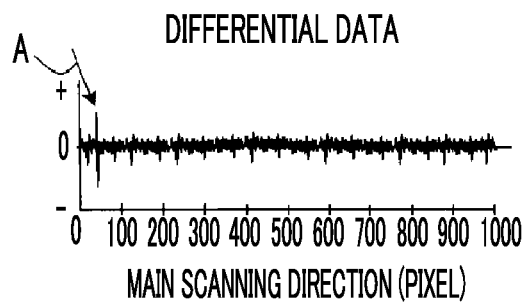
DIFFERENTIAL DATA
MAIN SCANNING DIRECTION (PIXEL)
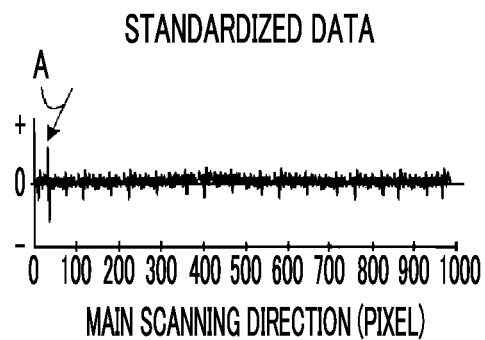
STANDARDIZED DATA
MAIN SCANNING DIRECTION (PIXEL)

FIG. 8B
READ BIT SIGNAL OF COMPONENT B OF DETECTION REFERENCE SURFACE (BLACK)
(ADDED VALUE OF FIVE TIMES OF READING)
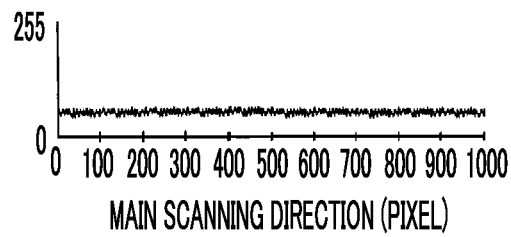
MAIN SCANNING DIRECTION (PIXEL)
DIFFERENTIAL DATA
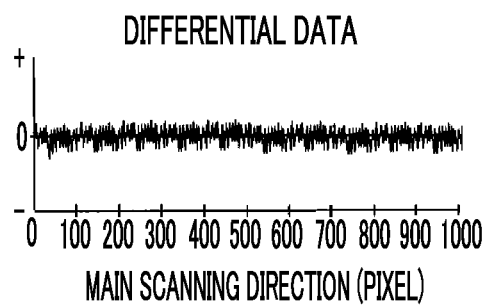
MAIN SCANNING DIRECTION (PIXEL)
STANDARDIZED DATA
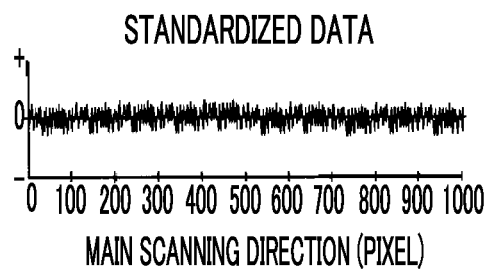
MAIN SCANNING DIRECTION (PIXEL)

FIG. 9A
WHITE DUST ATTACHED PATTERN ON WINDOW GLASS
(DETERMINATION 2 OF FIG. 7)
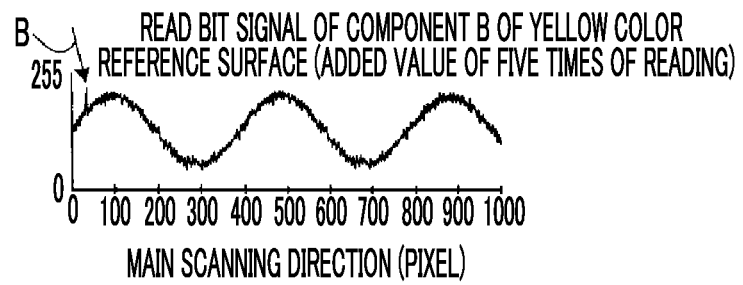
READ BIT SIGNAL OF COMPONENT B OF YELLOW COLOR
REFERENCE SURFACE (ADDED VALUE OF FIVE TIMES OF READING)
MAIN SCANNING DIRECTION (PIXEL)
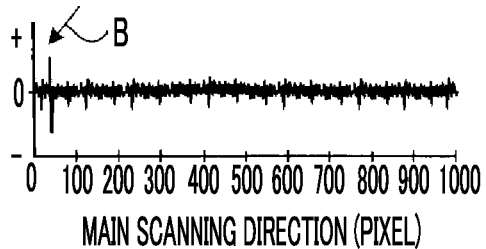
DIFFERENTIAL DATA
MAIN SCANNING DIRECTION (PIXEL)
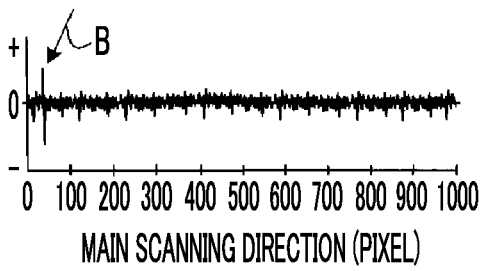
STANDARDIZED DATA
MAIN SCANNING DIRECTION (PIXEL)

FIG. 9B
READ SIGNAL OF COMPONENT B OF DETECTION REFERENCE
SURFACE (BLACK) (ADDED VALUE OF FIVE TIMES OF READING)
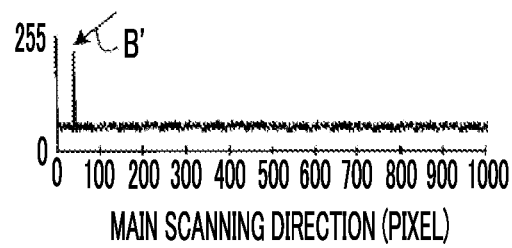
DIFFERENTIAL DATA
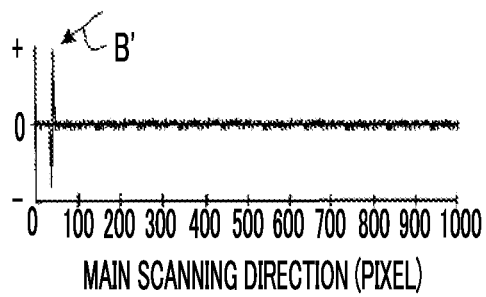
STANDARDIZED DATA
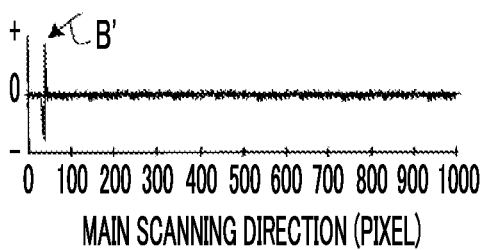

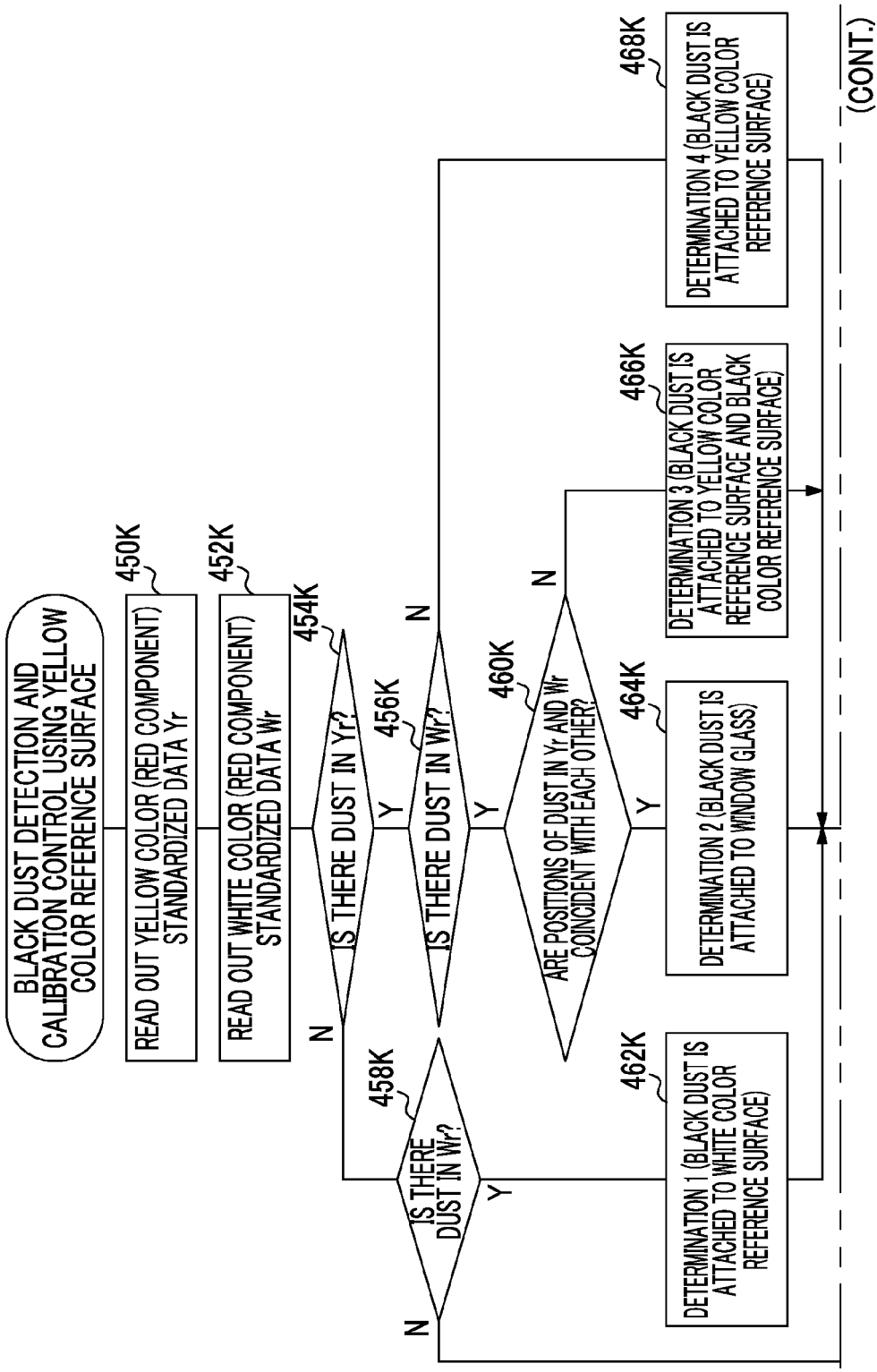

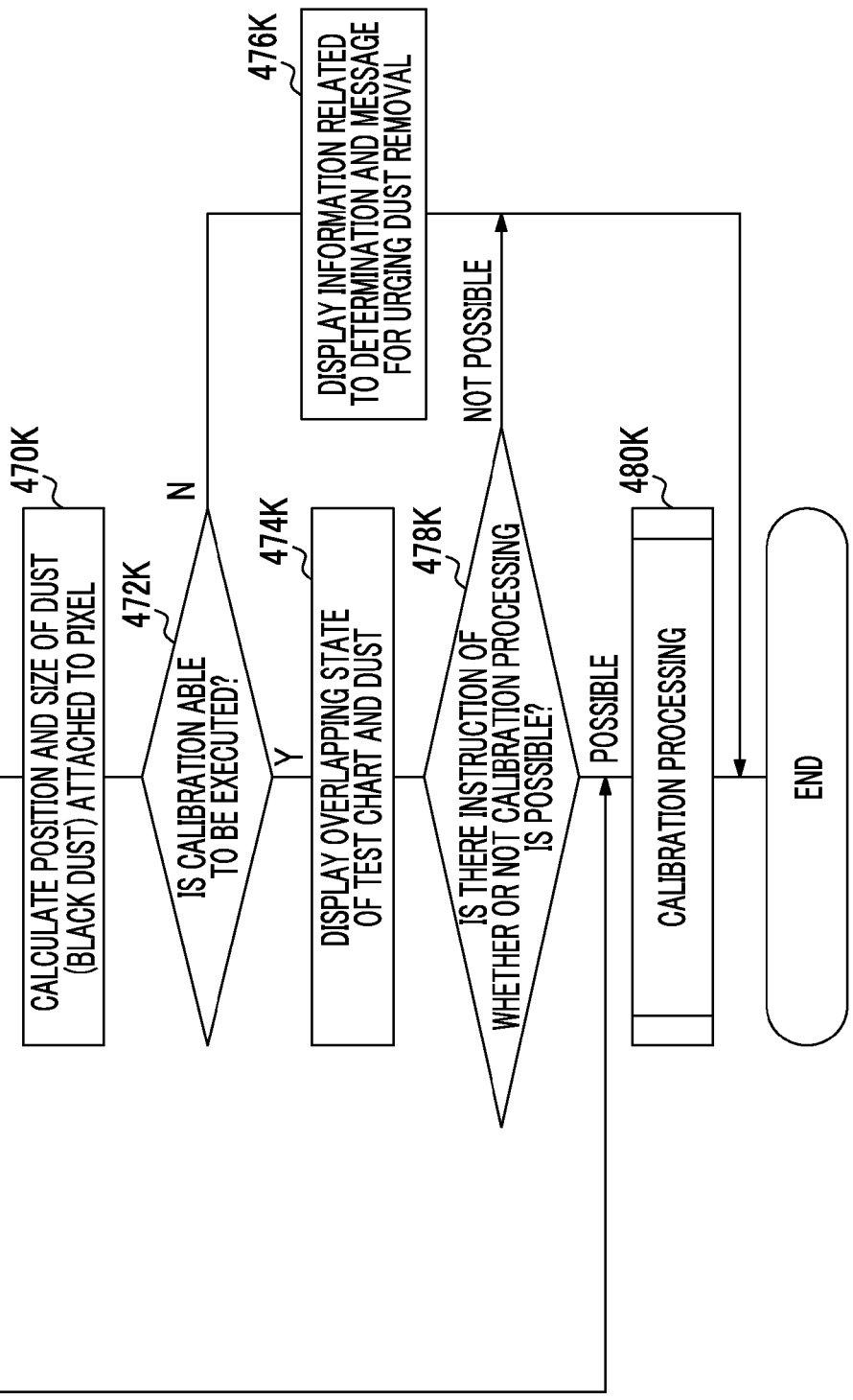

FIG. 11

ANALYSIS RESULT OF WHITE COLOR REFERENCE SURFACE, BLACK COLOR REFERENCE SURFACE, AND YELLOW COLOR REFERENCE SURFACE

| [WHITE DUST DETERMINATION] | | | | |
|---|---|---|---|---|
| Yb | Kb | Yb=Kb | WHITE DUST DETERMINATION | CORRESPONDENCE WITH FIG. 7 |
| O | O | O | WHITE DUST ON GLASS | DETERMINATION 2 |
| O | O | X | WHITE DUST ON Y SURFACE AND BLACK SURFACE | DETERMINATION 3 |
| O | X | **** | WHITE DUST ON Y SURFACE | DETERMINATION 4 |
| X | O | **** | WHITE DUST ON BLACK SURFACE | DETERMINATION 1 |
| X | X | **** | NO WHITE DUST | NORMAL DETERMINATION |

| [BLACK DUST DETERMINATION] | | | | |
|---|---|---|---|---|
| Yr | Wr | Yr=Wr | BLACK DUST DETERMINATION | CORRESPONDENCE WITH FIG. 10 |
| O | O | O | BLACK DUST ON GLASS | DETERMINATION 2 |
| O | O | X | BLACK DUST ON Y SURFACE AND WHITE SURFACE | DETERMINATION 3 |
| O | X | **** | BLACK DUST ON Y SURFACE | DETERMINATION 4 |
| X | O | **** | BLACK DUST ON WHITE SURFACE | DETERMINATION 1 |
| X | X | **** | NO BLACK DUST | NORMAL DETERMINATION |

IMAGE READING APPARATUS, AND IMAGE FORMING APPARATUS

CROSS-REFERENCE TO RELATED APPLICATIONS

This application is based on and claims priority under 35 USC 119 from Japanese Patent Application No. 2014-128496 filed Jun. 23, 2014.

BACKGROUND (i) Technical Field

The present invention relates to an image reading apparatus, and an image forming apparatus.

(ii) Related Art

An image forming apparatus has an image reading function of reading an image after being formed, and feeds the read image back to a color conversion processing control during forming the image.

SUMMARY

According to an aspect of the invention, there is provided an image reading apparatus, including:

an update unit that updates a color correction coefficient of an image read signal of an image read by a reading unit using a color reference surface provided with an achromatic color reference surface and a chromatic color reference surface;

a first detection unit that detects existence of dust based on read information of the achromatic color reference surface;

a second detection unit that detects existence of the dust based on the read information of the chromatic color reference surface; and a third detection unit that detects a type of an optical component onto which the dust is attached according to a detection result of the first detection unit and the second detection unit.

BRIEF DESCRIPTION OF THE DRAWINGS

Exemplary embodiments of the present invention will be described in detail based on the following figures, wherein:

FIG. 7 is a flowchart illustrating a white dust detection routine by a yellow color reference surface and a detection reference surface (a black color), and a calibration execution control routine;

FIGS. 8A and 8B are standardized data characteristic diagrams when the white dust is attached to the yellow color reference surface;

FIGS. 9A and 9B are standardized data characteristic diagrams when the white dust is attached to a window glass;

FIG. 10 is a flowchart illustrating a black dust detection routine by the yellow color reference surface and a white color reference surface, and a calibration processing execution control routine; and FIG. 11 is a chart illustrating a correspondence between Determination Results 1 to 4 of FIG. 7 and Determination Results 1 to 4 of FIG. 10 based on an analysis of standardized data Yb and Kb, and standardized data Yr and Wr.

DETAILED DESCRIPTION

Overall Configuration of Image Forming Apparatus

Figure 1:
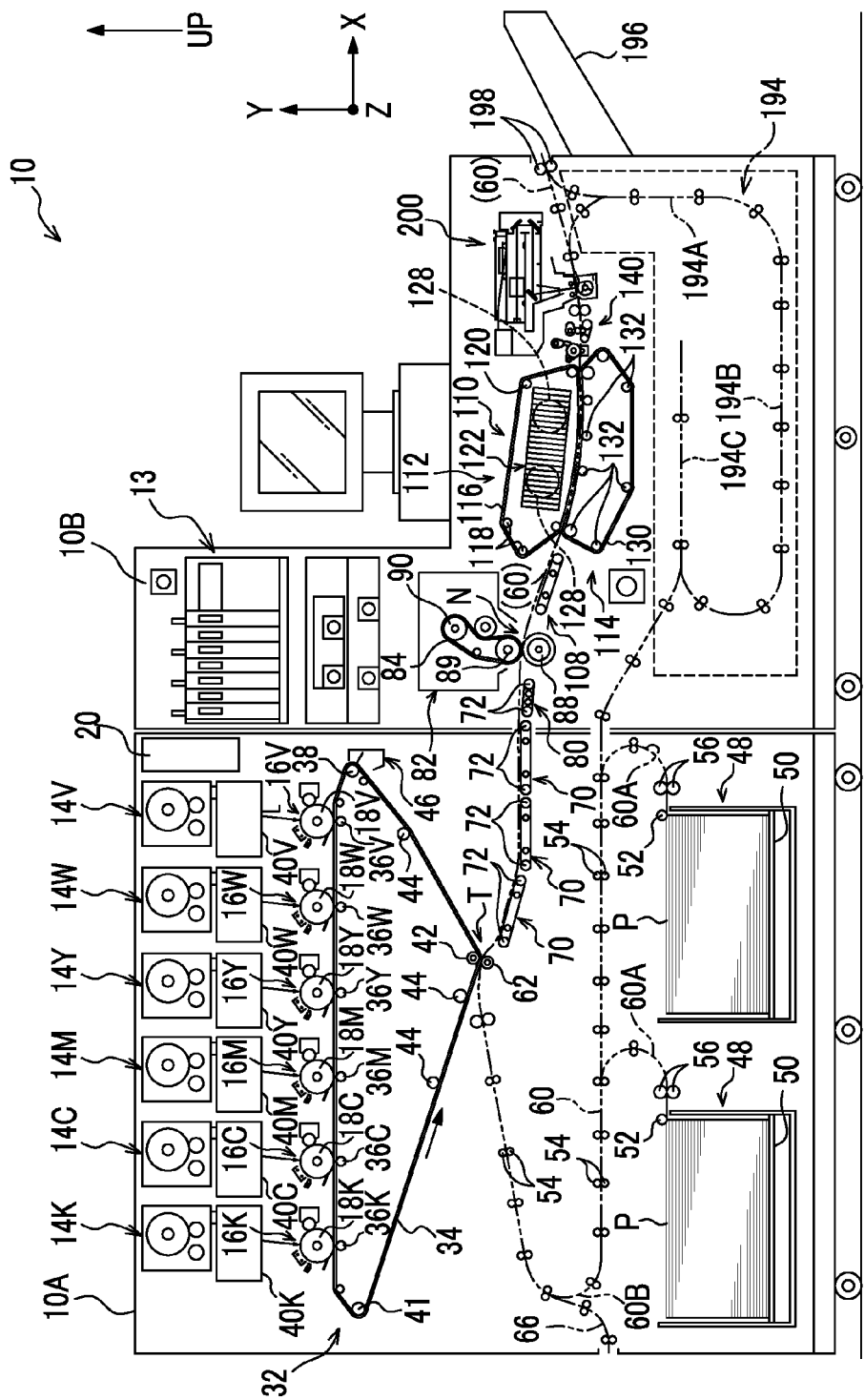
FIG. 1 is a schematic configuration diagram illustrating an example of a configuration of an image forming apparatus according to an exemplary embodiment of the invention.

As illustrated in FIG. 1, an image forming apparatus 10 according to an exemplary embodiment of the invention selectively forms a full-color image and a monochrome image, and includes a first housing 10A, and a second housing 10B connected to the first housing 10A. In an upper portion of the second housing 10B, an image signal processing section 13 for performing image processing with respect to image data supplied from an external device such as a computer is provided.

On the other hand, in an upper portion of the first housing 10A, toner cartridges 14V, 14W, 14Y, 14M, 14C, and 14K for containing each toner of a first special color (V), a second special color (W), yellow (Y), magenta (M), cyan (C), and black (K) are provided.

Furthermore, as the first special color and the second special color, colors (including a transparent color) other than yellow, magenta, cyan, and black are exemplified. In addition, in the following description, when the first special color (V), the second special color (W), yellow (Y), magenta (M), cyan (C), and black (K) are distinguished with respect to each constituent, it is described by reference numerals followed by any one of V, W, Y, M, C, and K. In addition, when the first special color (V), the second special color (W), yellow (Y), magenta (M), cyan (C), and black (K) are not distinguished, V, W, Y, M, C, and K are omitted.

On a lower side of the toner cartridge 14, six image forming units 16V, 16W, 16Y, 16M, 16C, and 16K (collectively referred to as an "image forming unit 16") corresponding to the toners of the respective colors are disposed to correspond to the toner cartridge 14.

Exposure devices 40V, 40W, 40Y, 40M, 40C, and 40K (collectively referred to as an "exposure device 40") disposed in the respective image forming units 16 receive the image data subjected to the image processing by the image signal processing section 13 described above from the image signal processing section 13. Then, the exposure device is configured to emit a light beam L modulated according to the image data to image holders 18V, 18W, 18Y, 18M, 18C, and 18K (collectively referred to as an "image holder 18") described later.

In the respective image forming units 16, the light beam L is emitted from the respective exposure devices 40 to the respective image holders 18, and thus an electrostatic latent image is formed in each of the image holders 18.

Around the respective image holders 18, a scorotron charger for charging the image holder 18 by a corona discharging method (a noncontact type charging method), a developing machine for developing the electrostatic latent image formed on the image holder 18 by the exposure device 40 with the toner which is an example of a developer, a blade for removing the developer which remains in the image holder 18 after a transfer, and a destaticizer for performing destaticization by emitting light to the image holder 18 after the transfer are disposed. Furthermore, the scorotron charger, the developing machine, the blade, and the destaticizer are arranged in this order facing a surface of the image holder 18 from an upstream side toward a downstream side in a rotating direction of the image holder 18.

In addition, on a lower side of the respective image forming units 16, a transfer section 32 is disposed. The transfer section 32 includes an annular intermediate transfer belt 34 which is in contact with the image holder 18, and first transfer rolls 36V, 36W, 36Y, 36M, 36C, and 36K (collectively referred to as a "first transfer roll 36") which multi-transfers the toner image formed on the image holder 18 to the intermediate transfer belt 34.

The intermediate transfer belt 34 is wound around a driving roll 38 driven by a motor (not illustrated), a tension applying roll 41 for applying tension to the intermediate transfer belt 34, a facing roll 42 facing a second transfer roll 62 described later, and plural winding rolls 44. Then, the intermediate transfer belt 34 is circularly moved in one direction (a counterclockwise direction in FIG. 1) by the driving roll 38.

The first transfer rolls 36 are arranged to face the image holders 18 of the respective image forming units 16 having the intermediate transfer belt 34 therebetween, respectively. In addition, a transfer bias voltage having a polarity opposite to that of the toner is applied to the first transfer roll 36 by a supply unit (not illustrated). According to this configuration, the toner image formed on the image holder 18 is transferred onto the intermediate transfer belt 34.

On an opposite side of the driving roll 38 across the intermediate transfer belt 34, a removing device 46 for removing a remaining toner, a paper powder, or the like on the intermediate transfer belt 34 by bringing a blade into contact with the intermediate transfer belt 34 is disposed.

On a lower side of the transfer section 32, plural recording medium containing units 48 in which a recording medium P such as paper as an example of a medium is contained is disposed. The respective recording medium containing units 48 are able to be pulled out from the first housing 10A. On an upper side of one end side (a right side in a front view of FIG. 1) of each of the recording medium containing units 48, a sending roll 52 for sending the recording medium P to a transporting path 60 from each of the recording medium containing units 48 is disposed.

In each of the recording medium containing units 48, a base plate 50 onto which the recording medium P is placed is disposed. When the recording medium containing unit 48 is pulled out from the first housing 10A, the base plate 50 is lowered according to an instruction of a control unit (not illustrated). The base plate 50 is lowered, and thus a space for which a user replenishes the recording medium P is formed in the recording medium containing unit 48.

When the recording medium containing unit 48 pulled out from the first housing 10A is mounted on the first housing 10A, the base plate 50 is lifted according to an instruction of the control unit. The base plate 50 is lifted, and thus the highest recording medium P placed on the base plate 50 and the sending roll 52 are in contact with each other.

On a downstream side in a recording medium transporting direction of the sending roll 52 (hereinafter, simply referred to as a "downstream side"), separation rolls 56 for separating the recording medium P sent out in a stack from the recording medium containing unit 48 one by one are disposed. On a downstream side of the separation roll 56, plural transport rolls 54 for transporting the recording medium P to the downstream side in the transporting direction is disposed.

The transporting path 60 disposed between the recording medium containing unit 48 and the transfer section 32 folds back the recording medium P which is sent out from the recording medium containing unit 48 to a left side in the front view of FIG. 1 in a first folding back portion 60A. Then, in a second folding back portion 60B, the transporting path 60 extends to a transfer position T between the second transfer roll 62 and the facing roll 42 such that the recording medium P is folded back to the right side in the front view of FIG. 1.

A transfer bias voltage having a polarity opposite to that of the toner is applied to the second transfer roll 62 by a power supply unit (not illustrated). According to this configuration, the toner image of each color which is multi-transferred onto the intermediate transfer belt 34 is secondly transferred onto the recording medium P transported along the transporting path 60 by the second transfer roll 62.

A spare path 66 extending from a side surface of the first housing 10A is disposed to be merged to the second folding back portion 60B of the transporting path 60. The recording medium P sent out from the other recording medium containing unit (not illustrated) arranged to be adjacent to the first housing 10A is inserted into the transporting path 60 through the spare path 66.

On a downstream side of the transfer position T, plural transport belts 70 for transporting the recording medium P to which the toner image is transferred toward the second housing 10B is disposed in the first housing 10A, and a transport belt 80 for transporting the recording medium P which is transported by the transport belt 70 to a downstream side is disposed in the second housing 10B.

The plural transport belts 70 and the transport belt 80 are formed to be in the shape of a ring, and are wound around a pair of winding rolls 72, respectively. The pair of winding rolls 72 is arranged on the upstream side and the downstream side in the transporting direction of the recording medium P, respectively, and one of the winding rolls 72 is rotated, and thus the transport belt 70 (the transport belt 80) is circularly moved in one direction (a clockwise direction in FIG. 1).

On a downstream side of the transport belt 80, a fixing unit 82 for fixing the toner image which is transferred onto a surface of the recording medium P to the recording medium P by heat and pressure is disposed.

The fixing unit 82 includes a fixing belt 84, and a pressure roll 88 which is arranged to be in contact with the fixing belt 84 on a lower side. A fixing unit N for fixing the toner image to the recording medium P by pressurizing and heating the recording medium P is formed between the fixing belt 84 and the pressure roll 88.

The fixing belt 84 is formed to be in the shape of a ring, and is wound around a driving roll 89 and a driven roll 90. The driving roll 89 faces the pressure roll 88 from an upper side, and the driven roll 90 is arranged on the upper side of the driving roll 89.

The driving roll 89 and the driven roll 90 are embedded with a heating unit such as a halogen heater, respectively. Accordingly, the fixing belt 84 is heated.

As illustrated in FIG. 1, on a downstream side of the fixing unit 82, a transport belt 108 for transporting the recording medium P which is sent out from the fixing unit 82 to the downstream side is disposed.

On a downstream side of the transport belt 108, a cooling unit 110 for cooling the recording medium P which is heated by the fixing unit 82 is disposed.

The cooling unit 110 includes an absorbing device 112 for absorbing heat of the recording medium P, and a pressing device 114 for pressing the recording medium P against the absorbing device 112. The absorbing device 112 is arranged on one side (an upper side in FIG. 1) with respect to the transporting path 60, and the pressing device 114 is arranged on the other side (a lower side in FIG. 1).

The absorbing device 112 includes an annular absorbing belt 116 for absorbing the heat of the recording medium P by being in contact with the recording medium P. The absorbing belt 116 is wound around a driving roll 120 which transmits driving force to the absorbing belt 116 and plural winding rolls 118.

On an inner circumference side of the absorbing belt 116, a heat sink 122 which is formed of, for example, an aluminum material, and radiates the heat absorbed in the absorbing belt 116 by being in contact with a surface of the absorbing belt 116 is disposed.

Further, a fan 128 for allowing hot air which takes the heat from the heat sink 122 to exit to the outside is arranged on aback side (an inner side of a sheet in FIG. 1) of the second housing 10B.

The pressing device 114 for pressing the recording medium P against the absorbing device 112 includes an annular pressing belt 130 which transports the recording medium P while pressing the recording medium P against the absorbing belt 116. The pressing belt 130 is wound around plural winding rolls 132.

On a downstream side of the cooling unit 110, a calibration device 140 which transports the recording medium P by sandwiching the recording medium P and corrects a curve (a curl) of the transported recording medium P is disposed.

On a downstream side of the calibration device 140, an image reading apparatus (a built-in image sensor 200) for detecting a toner density defection of the toner image fixed onto the recording medium P, an image defection, an image position defection, or the like is disposed. Furthermore, the built-in image sensor 200 will be described below in detail.

In addition, the following factors are considered with respect to the toner density defection.

Factor 1: a change in the toner density due to a change in temperature or humidity of a space (a room) in which the image forming apparatus 10 is disposed (an environmental change and a machine difference)

Factor 2: a change in the toner density due to time degradation of a component

Factor 3: a machine difference in the toner density due to a machine difference in the component Factor 4: a color conversion error On a downstream side of the built-in image sensor 200, exit rolls 198 for allowing the recording medium P having an image formed on one surface to exit to an exit portion 196 attached onto a side surface of the second housing 10B are disposed.

On the other hand, when the image is formed on both sides, the recording medium P sent out from the built-in image sensor 200 is transported to an inversion path 194 disposed on the downstream side of the built-in image sensor 200.

On the inversion path 194, a branch pass 194A branched from the transporting path 60, a paper transport pass 194B for transporting the recording medium P which is transported along the branch pass 194A toward the first housing 10A side, and an inversion pass 194C for inverting a front side and a back side of the recording medium P which is transported along the paper transport pass 194B by folding back the recording medium P toward an opposite direction and by performing switch back transport with respect to the recording medium P are disposed.

According to this configuration, the recording medium P which is switch back transported in the inversion pass 194C is transported toward the first housing 10A, and is inserted into the transporting path 60 disposed on the upper side of the recording medium containing unit 48, and thus is fed again into the transfer position T.

Built-in Image Sensor 200

The image forming apparatus 10 according to the exemplary embodiment of the invention includes the built-in image sensor 200. The built-in image sensor 200 is used for detecting whether or not there are abnormalities in the image formed on the recording medium P by the image forming unit 16, or the like.

The built-in image sensor 200 of this case has a function as a measuring unit for measuring gradation reproducibility or color reproducibility of the image forming unit 16. In addition, in order to maintain the function as the measuring unit normally, calibration of the built-in image sensor 200 may be regularly or irregularly executed.

In the following description, a length direction (a sub scanning direction which is the transporting direction of the recording medium P) of the image forming apparatus 10 is an X direction, a height direction of the apparatus is a Y direction, and a depth direction (a main scanning direction) of the apparatus is a Z direction (refer to FIG. 1 and FIG. 2).

Figure 2:
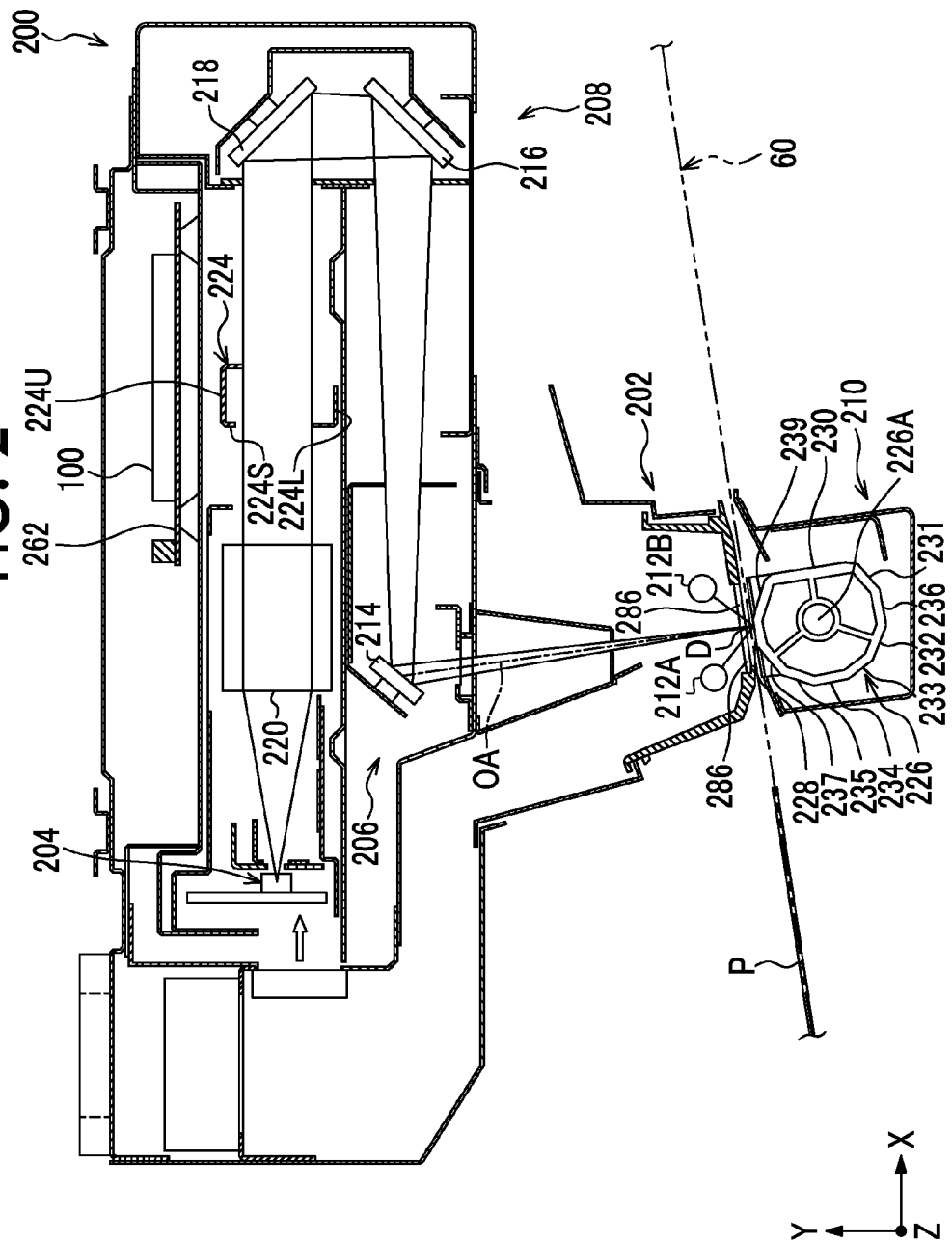
FIG. 2 is a schematic configuration diagram illustrating an example of a configuration of a built-in image sensor provided in the image forming apparatus according to the exemplary embodiment of the invention.

As illustrated in FIG. 2, the built-in image sensor 200 which is an example of the image reading apparatus includes an illumination unit 202 for emitting light toward the recording medium P on which the image is recorded, an imaging unit 208 provided with an imaging optical system 206 for imaging the light which is emitted from the illumination unit 202 and is reflected from the recording medium P on a CCD sensor 204 as an example of a reading unit, and a setting unit 210 in which various criteria at the time of using or calibrating the built-in image sensor 200 or the like are set.

Furthermore, the CCD sensor 204 according to the exemplary embodiment of the invention is provided with a red image sensor, a green image sensor, and a blue image sensor which are configured by including plural light receiving elements (for example, a photodiode) respectively arranged along a direction corresponding to the main scanning direction. The image sensor of each color includes a filter for transmitting light of each color component in a light receiving surface of the light receiving element. The image sensor of each color outputs an electric charge which is accumulated according to a light quantity of each color component of the light received by the light receiving element to the outside as a signal.

The illumination unit 202 is arranged on an upper side of the transporting path 60 of the recording medium P, and includes a pair of first lamp 212A and second lamp 212B (hereinafter, collectively referred to as a "lamp 212") of which a longitudinal direction is the Z direction (the main scanning direction).

As the lamp 212, for example, a fluorescent lamp, a xenon lamp, plural white color LEDs arranged along the main scanning direction, or the like are used, and in the exemplary embodiment of the invention, the plural white color LEDs (not illustrated) is used. In addition, in the exemplary embodiment of the invention, the lamp 212 is configured by arranging plural LED substrates (not illustrated) which is equipped with the plural white color LEDs in one row or plural rows in the main scanning direction. Obviously, the substrate equipped with the plural white color LEDs may be a single substrate.

Further, a length of an irradiation range of the lamp 212 is greater than a maximum width of the recording medium P to be transported. The lamp 212 is symmetrically arranged with respect to an optical axis OA (an optical axis in design) which is reflected by the recording medium P toward the imaging unit 208. More specifically, the lamp 212 is symmetrically arranged with respect to the optical axis OA such that irradiation angles with respect to the recording medium P are, for example, greater than or equal to 45° and lower than or equal to 50°, respectively.

Specifically, a pair of lamps 212 is arranged along the transporting path 60 of the recording medium P, and includes the first lamp 212A arranged on the upstream side in the transporting direction of the recording medium P, and the second lamp 212B arranged on the downstream side in the transporting direction of the recording medium P with respect to the first lamp 212A. Then, light emitted from the first lamp 212A and the second lamp 212B is emitted onto an irradiating position D on a transparent window glass 286 in the transporting path 60 between the first lamp 212A and the second lamp 212B. In the window glass 286, the irradiating region onto which the light is emitted from the lamp 212 is a region superposed onto an image forming region on the setting unit 210 through which the recording medium P passes, and includes a region (an image reading region) set in advance as a region in which the image formed on the recording medium P on the transporting path 60 is read by the CCD sensor 204.

In addition, the imaging optical system 206 includes a first mirror 214 for reflecting the light guided along the optical axis OA in the X direction (the downstream side in the transporting direction of the recording medium P in the exemplary embodiment of the invention), a second mirror 216 for reflecting the light reflected by the first mirror 214 toward an upper side, a third mirror 218 for reflecting the light reflected by the second mirror 216 to the upstream side in the transporting direction of the recording medium P, and a lens 220 for condensing (forming) the light reflected by the third mirror 218 onto the CCD sensor 204, as a main part. The CCD sensor 204 is arranged on the upstream side in the transporting direction of the recording medium P with respect to the optical axis OA.

A length of the first mirror 214 in the Z direction is greater than a maximum width of the recording medium P. Then, the first mirror 214, the second mirror 216, and the third mirror 218 reflect the reflected light of the recording medium P incident on the imaging optical system 206 while limiting (condensing) the light to the Z direction (the main scanning direction), respectively. Accordingly, the reflected light from each portion of the recording medium P in a width direction is incident on the approximately cylindrical lens 220.

Figure 4:
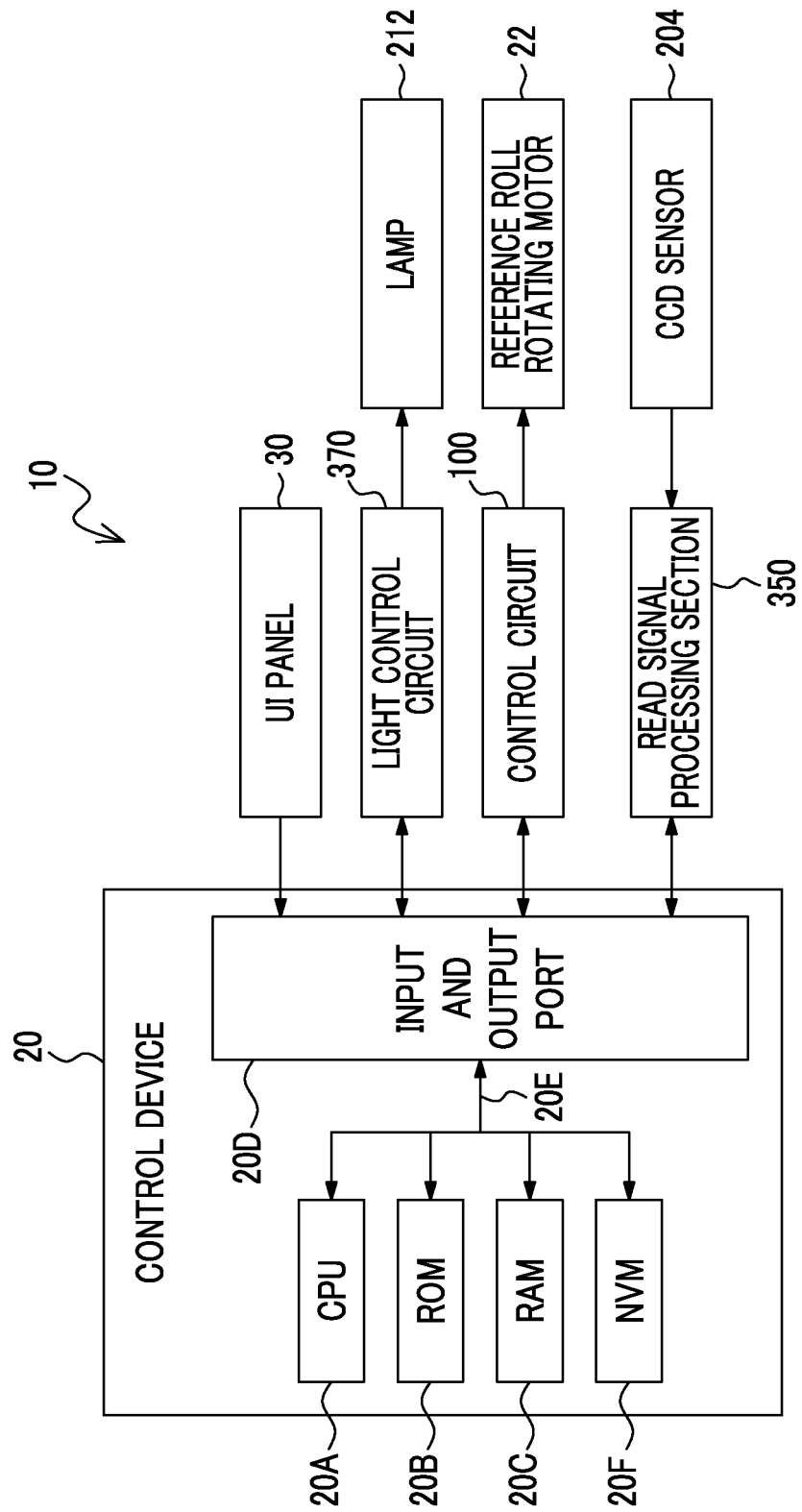
FIG. 4 is a block diagram illustrating an example of a main configuration of an electrical system in the image forming apparatus according to the exemplary embodiment of the invention.

The built-in image sensor 200 is configured such that the CCD sensor 204 outputs (feeds back) a signal according to the imaged light, that is, image density to a control device 20 of the image forming apparatus 10 (refer to FIG. 1 and FIG. 4). Furthermore, in addition to the control device 20 of the image forming apparatus 10, a control device for controlling the built-in image sensor 200 may be disposed separately. "Being disposed separately" includes a case where components which are commonly controlled by the substrate are separated from each other, in addition to a case where the substrates are structurally separated from each other.

The control device 20 performs correction processing with respect to the image formed by the image forming unit 16 based on the signal input from the built-in image sensor 200. As an example of the image correction processing, correction of a gradation adjustment look-up table (LUT) of the image forming apparatus 10 is included.

Furthermore, as another example of the image correction processing, correction of intensity of the irradiated light by the exposure device 40, an image forming position, or the like based on the signal input from the built-in image sensor 200, and correction of a developing potential or a transfer current value are included.

In addition, a light quantity limiting portion 224 (224L, 224S, and 224U) is disposed between the third mirror 218 and the lens 220 in the imaging optical system 206. The light quantity limiting portion 224 limits a light quantity of the light to be imaged on the CCD sensor 204 across an optical path in the Z direction to the Y direction (a direction intersecting with the main scanning direction), and is able to adjust a light quantity limiting amount by manipulating from the outside. The light quantity limiting amount by the light quantity limiting portion 224 is adjusted such that the light quantity imaged on the CCD sensor 204 is greater than or equal to a predetermined light quantity even when a light emission quantity of the lamp 212 is changed over time.

In addition, the built-in image sensor 200 includes a control circuit 100 provided with a circuit board 262 for controlling a reference roll rotating motor 22 (refer to FIG. 4) which is a motor for rotating a reference roll 226 described later.

The setting unit 210 includes the reference roll 226 of which a longitudinal direction is the Z direction. The reference roll 226 is formed to be in the shape of a polygonal cylinder in which a predetermined number of surfaces are formed in a circumferential direction, and as illustrated in FIG. 3, the reference roll 226 according to the exemplary embodiment of the invention is formed to be in the shape of a polygonal cylinder including 10 surfaces.

Figure 3:
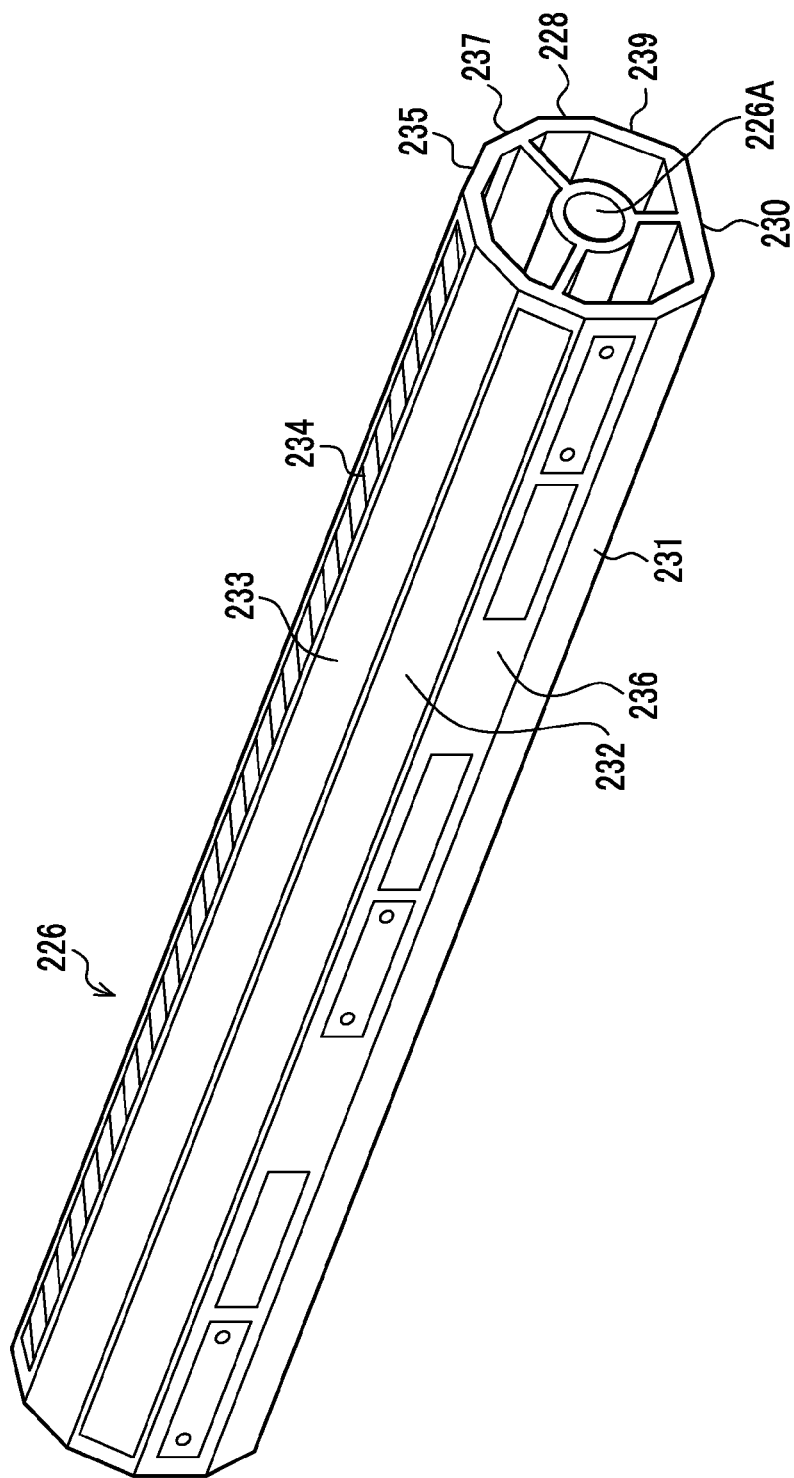
FIG. 3 is a perspective view of a reference roll according to the exemplary embodiment of the invention.

As illustrated in FIG. 2 and FIG. 3, the reference roll 226 includes a detection reference surface 228 (a basic color is a black color) which is towards the transporting path 60 side in a case of performing image detection with respect to the recording medium P, and a retraction surface 230 which is towards the transporting path side in a case of not performing the image detection with respect to the recording medium P by the built-in image sensor 200.

In addition, the reference roll 226 includes reference surfaces of each color (a white color reference surface 232, a yellow color reference surface 234, a cyan color reference surface 237, a magenta color reference surface 239, a red color reference surface 231, a green color reference surface 233, and a blue color reference surface 235) which are used for color gamut correction processing described later or the like, and a composite inspection surface 236 on which plural inspection patterns are formed. Furthermore, hereinafter, when the reference surfaces of each color are not distinguished, the reference surfaces of each color are simply referred to as a "color reference surface".

The reference roll 226 switches a surface to be towards the transporting path 60 side by being rotated around a rotational shaft 226A. The surface switching of the reference roll 226 is performed by the control circuit 100 provided in the circuit board 262.

In addition, the reference roll 226 is formed to be in the shape of a decagonal cylinder, and thus a difference between a distance from a center of each surface in the circumferential direction to a rotation center and a distance from a corner portion between the surfaces to the rotation center is suppressed to be small. Accordingly, the corner portion between the surfaces of the reference roll 226 does not interfere with the illumination unit 202 while suppressing a distance from each surface of the reference roll 226 to the irradiating position (the window glass 286) of the lamp 212 to be small.

A width of the detection reference surface 228 in the circumferential direction is less than that of the other surfaces, and the detection reference surface 228 is a position reference surface for positioning a detected (read) surface of the recording medium P to be transported onto the irradiating position by the lamp 212. The number of surfaces of the reference roll 226 in the circumferential direction may be greater than or equal to 12, and the surfaces on both sides of the detection reference surface 228 in the circumferential direction may be guide surfaces which do not have a function as each criterion described above.

A width of the retraction surface 230 in the circumferential direction is greater than the other surfaces. When the image detection is not performed with respect to the recording medium P by the built-in image sensor 200, the retraction surface 230 is a guide surface for guiding the recording medium P, and is formed such that a distance from an axial center of the rotational shaft 226A to the retraction surface 230 is smaller than a distance from the axial center of the rotational shaft 226A to the detection reference surface 228. Accordingly, when the image detection is not performed with respect to the recording medium P by the built-in image sensor 200, a transporting path in which a distance with respect to the illumination unit 202 (the window glass 286) is widened is formed, compared to a case where the image detection is performed with respect to the recording medium P by the built-in image sensor 200.

The composite inspection surface 236 is formed such that a position adjustment pattern for correcting a position of the reference roll 226 in a rotating direction (the transporting direction of the recording medium P), a focus detection pattern, and a depth detection pattern are arranged on the same surface.

The white color reference surface 232 is a reference surface for correcting unevenness in luminosity in the main scanning direction due to the lamp 212 or the CCD sensor 204, that is, for performing so-called shading correction, and for example, a white color film is adhered to the white color reference surface 232. When the white color reference surface 232 is irradiated with the irradiated light from the lamp 212, the reflected light reflected by the white color reference surface 232 is input to the CCD sensor 204 through the imaging optical system 206 as a read signal.

The reference surfaces of each color (the white color reference surface 232, the yellow color reference surface 234, the cyan color reference surface 237, the magenta color reference surface 239, the red color reference surface 231, the green color reference surface 233, and the blue color reference surface 235) including the white color reference surface 232 described above according to the exemplary embodiment of the invention are used as a reference surface (a color card) for correcting unevenness in color phase and chromaticness in the main scanning direction due to the lamp 212 or the CCD sensor 204. For example, films of each color are adhered to the reference surfaces of each color. When the reference surfaces of each color are irradiated with the irradiated light from the lamp 212, the reflected light reflected by the reference surfaces of each color is input to the CCD sensor 204 through the imaging optical system 206 as the read signal.

FIG. 4 is a block diagram illustrating a control system in the image forming apparatus 10 according to the exemplary embodiment of the invention.

As described above, the control device 20 has a function of correcting the image formed by the image forming unit 16 based on the signal from the built-in image sensor 200. In addition, the control device 20 has a function of controlling the calibration of the built-in image sensor 200 (for example, the calibration of the CCD sensor 204 described above, or the like).

More specifically, as illustrated in FIG. 4, the control device 20 includes a Central Processing Unit (CPU) 20A, a Read Only Memory (ROM) 20B, a Random Access Memory (RAM) 20C, a Non Volatile Memory (NVM) 20F, and an input and output port 20D. Then, they are connected with each other through a bus 20E such as an address bus, a data bus, and a control bus, respectively.

In the ROM 20B, various programs are stored. The CPU 20A reads the program from the ROM 20B, and executes the program by developing the program in the RAM 20C, and thus various controls are performed.

The NVM 20F is a non-volatile storage medium for storing various information items which should be maintained even when a power source switch of the apparatus is turned off.

A user interface (UI) panel 30, a light control circuit 370, the control circuit 100, and a read signal processing section 350 are connected to the input and output port 20D.

As an example, the UI panel 30 is configured by a touch panel display in which a transmissive touch panel is superposed on display, or the like. Then, the various information items are displayed on a display surface of the display, and the user touches the touch panel, and thus information or an instruction is received. Furthermore, in the exemplary embodiment of the invention, an example to which the UI panel 30 is applied is described, but the exemplary embodiment of the invention is not limited thereto, and a manipulation unit in which a display unit such as a liquid crystal display and a numeric keypad, a manipulation button, or the like are disposed may be disposed separately.

The light control circuit 370 is a circuit which controls a current flowing through a white color LED configuring the lamp 212 and continuously changes brightness of the lamp 212 when light control reading of the reference surfaces of each color described later is executed. Furthermore, the "light control reading" in the exemplary embodiment of the invention performs light control with respect to the lamp 212 by changing the current flowing through the white color LED in a predetermined phase, and reads the reflected light from the reference surfaces of each color by the CCD sensor 204 in light control states of each phase.

In addition, as described above, the control circuit 100 controls a switch of each surface (the detection reference surface 228, the retraction surface 230, the composite inspection surface 236, and the reference surfaces of each color) of the reference roll 226. Specifically, driving of the reference roll rotating motor 22 connected to the control circuit 100 is controlled based on an instruction of the control device 20.

On the other hand, the read signal processing section 350 performs various calibrations of the built-in image sensor 200 connected at least to the read signal processing section 350, and the color gamut correction processing according to the instruction of the control device 20.

As the calibration of the built-in image sensor 200, for example, offset for correcting an output upper limit value and a lower limit value of the CCD sensor 204, and gain correction are included.

In addition, shading correction for correcting a luminosity distribution of the image data in the main scanning direction based on a profile of the image data obtained by reading the white color reference surface 232 is included.

Further, correction for correcting unevenness in color phase and chromaticness in the main scanning direction with respect to the image data based on the profile of the image data obtained by reading the reference surfaces of each color, and the like are included.

Each of the units configuring the read signal processing section 350 according to the exemplary embodiment of the invention, is controlled by a control signal (not illustrated) from the CPU 20A which is input through the input and output port 20D.

However, in the built-in image sensor 200, as one aspect of the correction (the calibration), hue correction, that is, correction of color phase and chromaticness in addition to luminosity may be performed with respect to the image data based on a read value obtained by reading the image formed on the recording medium P, or the like.

This is because there is a difference in color phase and chromaticness for each built-in image sensor 200 due to a machine difference such as the illumination unit 202 or the CCD sensor 204, a chronological change, or the like even when the read value is obtained by reading the same image.

That is, for example, there is a machine difference or a chronological change in the read value as the image data for each built-in image sensor 200 according to a difference in sensitivity due to a manufacturing deviation of the filter in the CCD sensor 204, a change in sensitivity due to a chronological change of the filter, or the like.

As one method of the correction described above, a method for using a test chart including a gradation patch image of each color component formed on color printing paper or the like of which color properties are known. This is a method in which color measurement is performed by reading the test chart by the built-in image sensor 200 or the like, and a color conversion coefficient for converting the image data acquired by the color measurement to criterion image data which is a target corresponding to the test chart is calculated.

When reading is executed by the CCD sensor 204, the built-in image sensor 200 outputs the image data which is subjected to the correction by the calculated color conversion coefficient to the read image data or the like. However, in this method, there is a trouble that the test chart should be used for plural colors whenever the correction is performed. In addition, the test chart itself which is required to strictly manage a color difference is expensive, and the color difference in the test chart may be changed over time (for example, a change in color).

Therefore, in the image forming apparatus 10 according to the exemplary embodiment of the invention, as one aspect of the calibration processing, correction of luminosity, a color phase, and chromaticness (that is, a color gamut) by using the reference surfaces of each color is performed. In this case, a sensitivity adjustment or a read value of the CCD sensor 204 is directly corrected.

Furthermore, the reference surfaces of each color may be irradiated with the irradiated light from the lamp 212 while controlling the irradiated light, the read value (hereinafter, the read value may be referred to as a "light control read value") which is obtained by reading the reflected light using the CCD sensor 204 may be acquired, and when the image formed by the image forming apparatus 10 or the like is read by the built-in image sensor 200, a machine difference in the color gamut for each built-in image sensor 200 may be corrected based on the light control read value.

Here, there is a problem that dust is attached to the reference surfaces of each color. Due to the dust, it is difficult to perform suitable correction, and thus it is necessary to confirm whether or not the dust is attached in advance.

On the other hand, the window glass 286 is disposed on the optical path along the optical axis OA (refer to FIG. 3) described above, and the dust is attached to the window glass 286.

Regarding existence or non-existence of the attached dust and a position of the attached dust, for example, when black dust is attached to the white color reference surface 232, a remarkable difference occurs in a detected signal by the CCD sensor 204 according to the existence or non-existence of the dust, and thus the black dust is easily detected.

In addition, when dust detection is limited to the window glass 286, white dust and black dust are able to be discriminated by concurrently using the white color reference surface 232 and the detection reference surface 228. In this case, it is preferable that the lamp 212 be lighted. When the lamp 212 is lighted out to be into complete darkness without light, the read value is 0.

However, the reference roll applied to the exemplary embodiment of the invention includes a color reference surface of a chromatic color (the yellow color reference surface 234, the cyan color reference surface 237, the magenta color reference surface 239, the red color reference surface 231, the green color reference surface 233, and the blue color reference surface 235) in addition to a color reference surface of an achromatic color (the white color reference surface 232 and the detection reference surface 228 (a black color)), and in particular, the existence or non-existence of the attached dust, and the location thereof with respect to the color reference surface of the chromatic color are not discriminated. In other words, when the dust is attached to the color reference surface of the chromatic color, a remarkable difference in density may not occur, and thus it is difficult to discriminate the existence or non-existence of the attached dust, and the location thereof compared to the reference surface of the achromatic color.

Therefore, in the exemplary embodiment of the invention, an algorithm by which the existence or non-existence of the attached dust (the white dust and the black dust) in each reference surface is able to be discriminated, and whether the existing dust is in the reference surface or in the window glass 286 is able to be discriminated is established.

Figure 5:
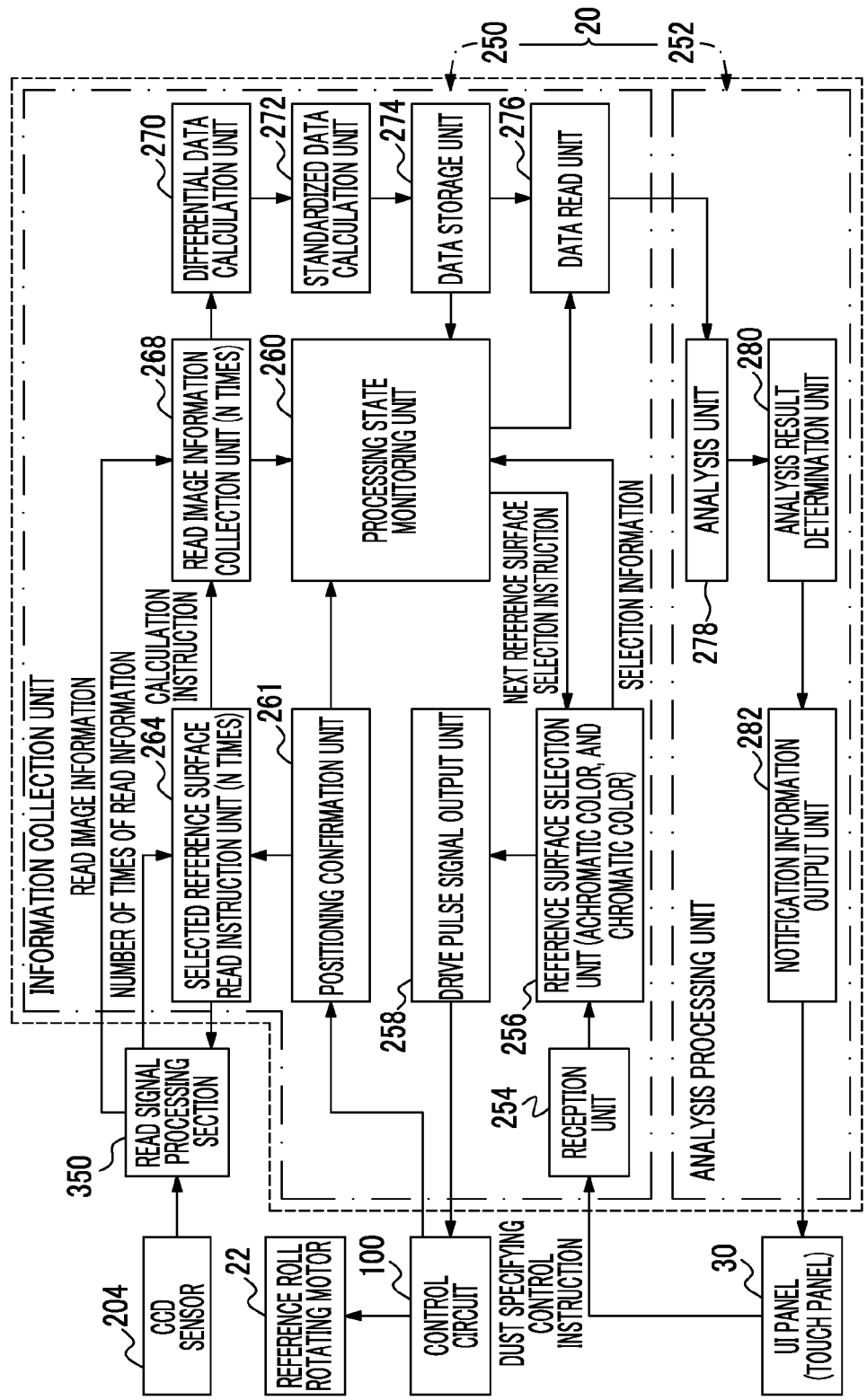
FIG. 5 is a functional block specialized in dust specifying control which is executed by a control device of the exemplary embodiment of the invention.

FIG. 5 is a functional block specialized in dust specifying control which is executed by the control device 20 of the exemplary embodiment of the invention. Furthermore, FIG. 5 illustrates a configuration in which functions executed in the CPU 20A as a main part of the control device 20 are specialized in the dust specifying control and blocked functionally, and a hardware configuration of the control device 20 is not limited thereto. In addition, a dedicated control device (for example, ASIC) for the dust specifying control may be included.

As illustrated in FIG. 5, the control device 20 according to the dust specifying control includes an information collection unit 250 and an analysis processing unit 252.

The UI panel 30 is connected to a reception unit 254 of the information collection unit 250, and when the reception unit 254 receives an instruction of executing the dust specifying control by manipulating the UI panel 30, a reference surface selection unit 256 is activated.

The reference surface selection unit 256 is connected to a drive pulse signal output unit 258 and a processing state monitoring unit 260. When the reference surface selection unit 256 is activated, the reference surface is selected in a predetermined order. The selecting order is not particularly limited, but it is efficient to select along an arrangement order of the reference roll 226 in the circumferential direction, and as an example, an order of the white color reference surface 232→the green color reference surface 233→the yellow color reference surface 234→the blue color reference surface 235→the cyan color reference surface 237→the detection reference surface 228 (a black color)→the magenta color reference surface 239→the red color reference surface 231, or an order in an opposite direction thereof may be preferable.

In this case, the detection reference surface 228 (a black color) applied to a next process (an image reading process) may be selected at the end.

Furthermore, an order of the color reference surface of the achromatic color→the color reference surface of the chromatic color, or an order of the color reference surface of the chromatic color→the color reference surface of the achromatic color may be included.

The reference surface selection information selected by the reference surface selection unit 256 is sent to the drive pulse signal output unit 258 and the processing state monitoring unit 260.

In the drive pulse signal output unit 258, a drive pulse signal for rotating the reference roll rotating motor 22 is output to the control circuit 100. Accordingly, in the control circuit 100, the reference roll rotating motor 22 is driven, and the selected reference surface is arranged on the OA optical axis (facing the window glass 286).

In the control circuit 100, a driving condition of the reference roll rotating motor 22 is recognized, and a positioning completion signal by which the selected reference surface is positioned is output to a positioning confirmation unit 261. Furthermore, the positioning confirmation unit 261 may arrange a rotating position sensor which detects that each of the reference surfaces is positioned on the optical axis OA around the reference roll rotating motor 22, and may receive a signal from the rotating position sensor.

The positioning confirmation unit 261 is connected to the processing state monitoring unit 260 and a selected reference surface read instruction unit 264. The positioning confirmation unit 261 outputs positioning completion information of a specified reference surface to the processing state monitoring unit 260, and outputs a reading execution start instruction to the selected reference surface read instruction unit 264 to execute the reading by the CCD sensor 204.

The selected reference surface read instruction unit 264 which receives the reading execution start instruction controls the read signal processing section 350, and reads the image of the positioned reference surface by the CCD sensor 204.

In the read signal processing section 350, image information of the reference surface read by the CCD sensor 204 is sent to a read image information collection unit 268.

In addition, in the read signal processing section 350, end information is fed back to the selected reference surface read instruction unit 264 whenever the read processing is ended. In the selected reference surface read instruction unit 264, a reading execution instruction is output to the read signal processing section 350 by a predetermined number of times (N times). Furthermore, in the exemplary embodiment of the invention, the number of times of reading N with respect to one reference surface is 5 times.

In addition, the image reading is executed for each color component of RGB. The details will be described later, but according to a type of the dust (the white dust or the black dust), with respect to the color reference surface, a color component which is a complementary color (the white dust), or a color component which is not a complementary color (the black dust) is used for discriminating the dust.

The white dust and the black dust indicate relatively different reflection ratios, in which the white dust indicates a relatively high reflection ratio, and the black dust indicates a relatively low reflection ratio. For example, by setting a grey color (an intermediate gradation) as a boundary, a region in which a reflection ratio is lower than that of the grey color may be the black dust, and a region in which a reflection ratio is higher than that of the grey color may be the white dust. The grey color may belong to any region.

In the selected reference surface read instruction unit 264, when read instruction of N times is output to the read signal processing section 350, a calculation instruction is output to the read image information collection unit 268.

In the read image information collection unit 268, when the calculation instruction is received, N times (in the exemplary embodiment of the invention, 5 times) of read image information is collected, and intensity (a density value) of the read image of N times information is simply added, and thus the added data is sent to a differential data calculation unit 270. In addition, in the read image information collection unit 268, an end signal is sent to the processing state monitoring unit 260 whenever one time of adding calculation (adding calculation for each reference surface) is ended.

In the processing state monitoring unit 260, the reference surface selection information is received from the reference surface selection unit 256, the positioning end information is received from the positioning confirmation unit 261, and the calculation end information is received from the read image information collection unit 268, and thus the image reading process with respect to each of the reference surfaces is monitored, a moment for performing the image reading process with respect to the next reference surface is understood, and the next reference surface selection instruction is sent to the reference surface selection unit 256.

In the differential data calculation unit 270, the data subjected to the adding calculation is converted into differential data with respect to adjacent information (a pixel), and is sent to a standardized data calculation unit 272.

In the standardized data calculation unit 272, standardized data for each color component (red (r), green (g), and blue (b)) is calculated from the differential data, and stored in a data storage unit 274. Accordingly, in the data storage unit 274, the standardized data for each reference surface is stored. For example, as standardized data of the detection reference surface 228 (a black color), Kr, Kg, and Kb are calculated, and as standardized data of the white color reference surface 232, Wr, Wg, and Wb are calculated. The same applies to the chromatic color reference surface.

The standardized data is obtained for each color component, and the color component on which the attached dust is most remarkably expressed is selected. For example, in the white dust on the yellow color reference surface 234, the attached dust is most remarkably expressed on a blue color component (a component b) which is a complementary color of a color (a yellow color) of the yellow color reference surface 234.

On the other hand, in the black dust on the yellow color reference surface 234, the attached dust is most remarkably expressed on a red color component (a component r) which is not the complementary color of the color (the yellow color) of the yellow color reference surface 234.

Furthermore, regarding the yellow color reference surface 234, a green color component (a G component) may be used as the color component which is not the complementary color.

In the data storage unit 274, all the data, that is, the data of the color reference surface of the chromatic color (the yellow color reference surface 234, the cyan color reference surface 237, the magenta color reference surface 239, the red color reference surface 231, the green color reference surface 233, and the blue color reference surface 235) in addition to the data of the color reference surface of the achromatic color (the white color reference surface 232 and the detection reference surface 228 (a black color)) are gathered, and a signal (a storage completion signal) indicating that the data is gathered is sent to the processing state monitoring unit 260.

In the processing state monitoring unit 260, when the storage completion signal is received, an instruction of reading out the standardized data of each reference surface from the data storage unit 274 (a read instruction) is output to a data read unit 276.

In the data read unit 276, when the read instruction is received, the standardized data of each reference surface is read out from the data storage unit 274, and the standardized data of each reference surface is sent to an analysis unit 278 of the analysis processing unit 252.

In the analysis unit 278, for example, a collation of the standardized data between plural color reference surfaces is performed. The collation includes checking for existence or non-existence of an output which is considered as the dust, and a determination of coincidency of a position in plural criteria.

The analysis unit 278 is connected to an analysis result determination unit 280, and performs a determination based on an analysis result, that is, determines existence or non-existence, a type, and a position of the dust.

For example, a chart illustrated in FIG. 11 collectively shows a result of a collation between the yellow color reference surface 234 and the detection reference surface 228 (a black color), a result of a collation between the yellow color reference surface 234 and the white color reference surface 232, and a determination result thereof (the detail will be described later).

The analysis result determination unit 280 is connected to a notification information output unit 282. The notification information output unit 282 selects a message to be notified to the user which is received from the analysis result determination unit 280, and displays the message on a display surface of the UI panel 30.

For example, a message such as a message of "The white dust is attached to an area s with coordinates (x, y) of the window glass as a center.", or a message of "The black dust is attached to an area s with coordinates (x, y) of the window glass as a center." is displayed. The coordinates may be a numerical value, and may be an unclear expression such as "on a diagonal line" or "an upper left corner portion". In addition, the area may be a numerical value, and may be the number of pixels.

Hereinafter, a mechanism of the exemplary embodiment of the invention will be described.

First, the image forming process of the image forming apparatus 10 will be described.

The image data subjected to the image processing in the image signal processing section 13 is sent to each of the exposure devices 40. In each of the exposure devices 40, each light beams L is emitted according to the image data to expose each of the image holders 18 which is charged by the scorotron charger, and an electrostatic latent image is formed.

The electrostatic latent image formed on the image holder 18 is developed by a developing machine, and toner images of each color of a first special color (V), a second special color (W), yellow (Y), magenta (M), cyan (C), and black (K) are formed.

As illustrated FIG. 1, the toner images of each color formed on the image holder 18 of each of the image forming units 16V, 16W, 16Y, 16M, 16C, and 16K are sequentially multi-transferred onto the intermediate transfer belt 34 by the six first transfer rolls 36V, 36W, 36Y, 36M, 36C, and 36K.

The toner image of each color multi-transferred onto the intermediate transfer belt 34 is secondly transferred onto the recording medium P which is transported from the recording medium containing unit 48 by the second transfer roll 62. The recording medium P onto which the toner image is transferred is transported toward the fixing unit 82 disposed inside the second housing 10B by the transport belt 70.

The toner image of each color on the recording medium P is heated and pressed by the fixing unit 82, and thus is fixed to the recording medium P. Further, the recording medium P to which the toner image is fixed is cooled by passing through the cooling unit 110, and then is sent to the calibration device 140, and a curve generated on the recording medium P is corrected.

With respect to the recording medium P on which the curve is corrected, an image defection or the like is detected by the built-in image sensor 200, and then is allowed to exit to the exit portion 196 by the exit roll 198.

On the other hand, when the image is formed on a non-image surface on which an image is not formed (in a case of performing duplex printing), the recording medium P is inversed by the inversion path 194 after passing through the built-in image sensor 200. Then, the recording medium P is sent to the transporting path 60 disposed on the upper side of the recording medium containing unit 48, and the toner image is formed on a back surface in the order described above.

Furthermore, in the image forming apparatus 10 according to the exemplary embodiment of the invention, components (the image forming units 16V and 16W, the exposure devices 40V and 40W, the toner cartridges 14V and 14W, and the first transfer rolls 36V and 36W) for forming images of the first special color and the second special color are configured to be mountable on the first housing 10A as an additional component according to selection of the user. Accordingly, as the image forming apparatus 10, a configuration which does not include the components for forming the images of the first special color and the second special color, and a configuration which includes only a component for forming an image of any one color of the first special color and the second special color may be used.

Next, in the built-in image sensor 200, a toner density defection (refer to Factor 1 to Factor 4 described above), an image defection, an image position defection, and the like of the toner image fixed on the recording medium P are detected.

The toner density defection is corrected by reading the toner image using the built-in image sensor 200, feeding back the toner image to the image forming unit, and performing the correction with respect to an environmental change and a machine difference, time degradation of the component, and a machine difference of the component (Factor 1 to Factor 3).

In addition, the toner density defection is corrected regarding a color conversion error (Factor 4), for example, by intermediately converting the image data (RGB) which is received during forming the image into an L*a*b* color space or the like and then into cmyk which is a toner image. When the color converting process is performed, a color which is able to be reproduced may exist. Therefore, the toner image is read by the built-in image sensor 200, and is fed back to the image forming unit, and the correction is performed to obtain a suitable color conversion.

In addition, regarding the image defection, feedback correction for being interpolated by circumferential image data is executed, and regarding the image position defection, feedback correction for changing a position of the image is executed.

However, the feedback correction by the built-in image sensor 200 is based on a fact that hue (luminosity, a color phase, and chromaticness) is suitably read by the CCD sensor 204.

However, according to a difference in sensitivity due to a manufacturing deviation of the filter in the CCD sensor 204, a change in sensitivity due to a chronological change of the filter, or the like, a machine difference or a chronological change may occur in the read value as the image data for each built-in image sensor 200.

Therefore, in the built-in image sensor 200, as one aspect of the calibration processing, correction of luminosity, a color phase, and chromaticness (that is, a color gamut) is performed by using the reference surfaces of each color. In this case, a sensitivity adjustment or a read value of the CCD sensor 204 is directly corrected.

Furthermore, the reference surfaces of each color may be irradiated with the irradiated light from the lamp 212 while controlling the irradiated light, the read value (hereinafter, the read value is referred to as a "light control read value") which is obtained by reading the reflected light using the CCD sensor 204 may be acquired, and when the image formed by the image forming apparatus 10 or the like is read by the built-in image sensor 200, a machine difference in the color gamut or the like for each built-in image sensor 200 may be corrected based on the light control read value.

Dust Detection

When the calibration processing of the built-in image sensor 200 is performed, it is necessary to confirm existence or non-existence of the attached dust which is attached to the reference surfaces of each color and/or the window glass 286.

In the exemplary embodiment of the invention, an algorithm by which the existence or non-existence of the attached dust (the white dust and the black dust) in each reference surface is able to be discriminated, and whether the existing dust is in the reference surface or in the window glass 286 is able to be discriminated is established.

Figure 6A:
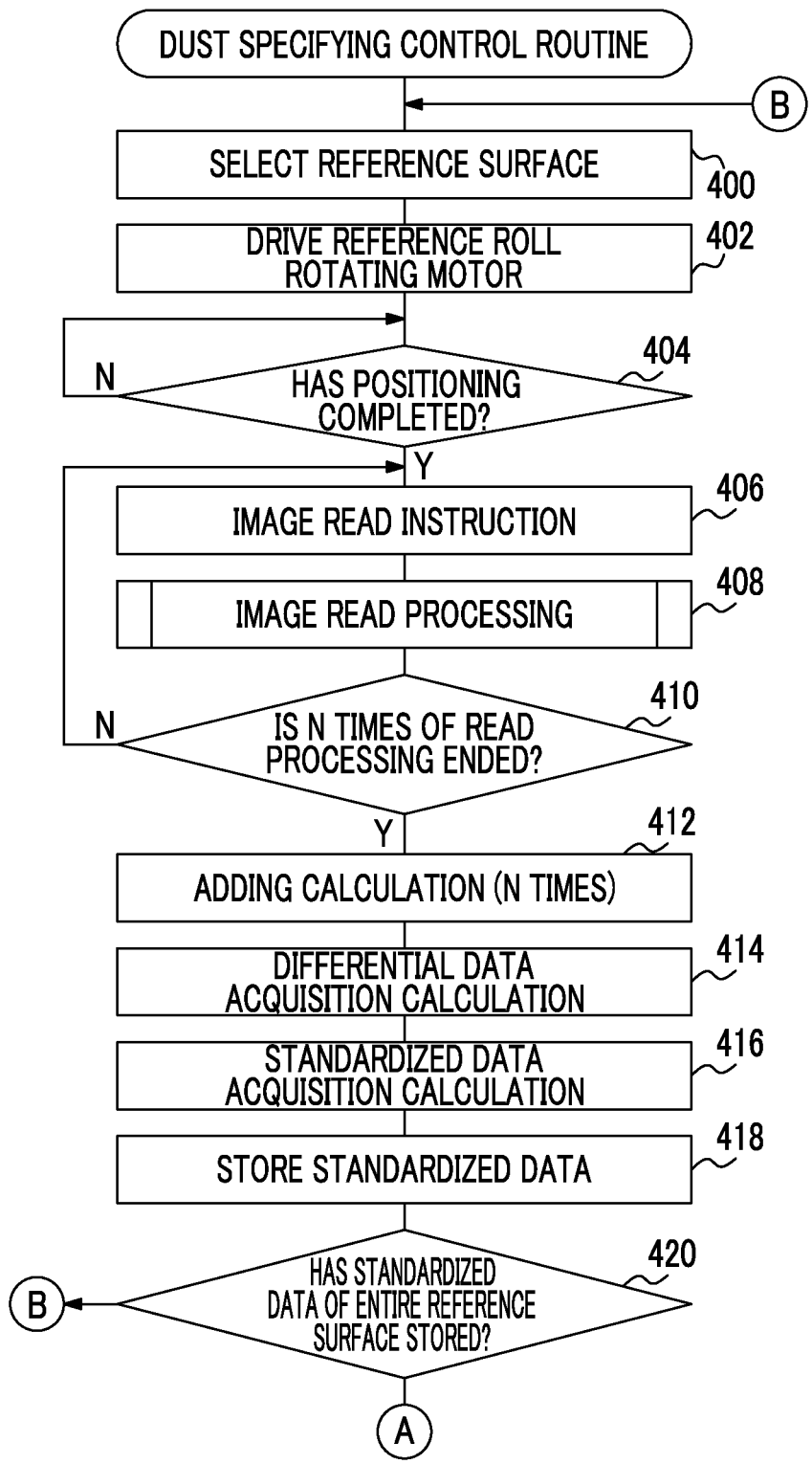
FIGS. 6A and 6B are flowcharts illustrating a dust specifying control routine which is executed by the control device according to the exemplary embodiment of the invention.
Figure 6B:
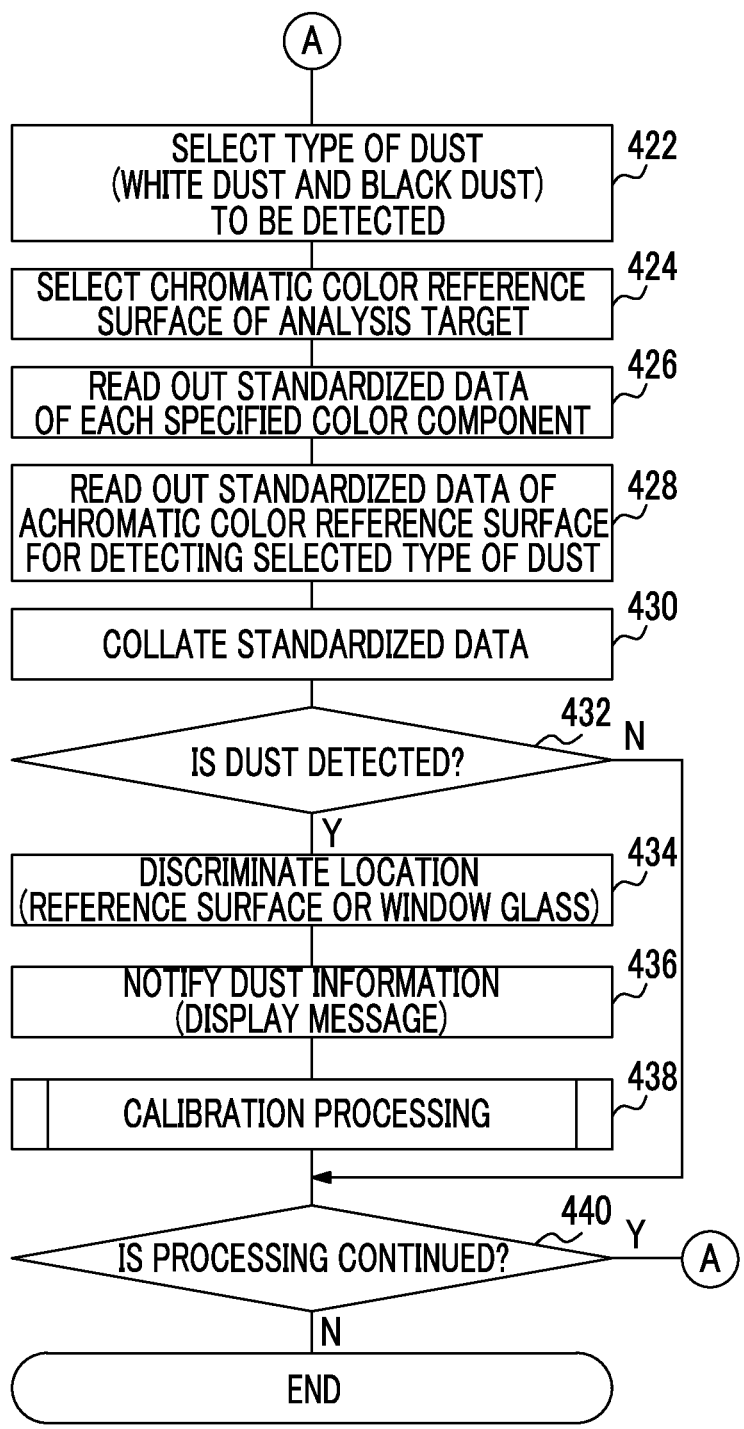

FIGS. 6A and 6B are flowcharts illustrating a dust specifying control routine which is executed by the control device 20.

In Step 400, the reference surface is selected. A selecting order is not particularly limited, but for efficiency, an order in the rotating direction is preferable. That is, as an example, the white color reference surface 232→the green color reference surface 233→the yellow color reference surface 234→the blue color reference surface 235→the cyan color reference surface 237→the detection reference surface 228 (a black color)→the magenta color reference surface 239→the red color reference surface 231, or an order in an opposite direction thereof is selected.

In Step 400, when the reference surface is selected, in the next Step 402, in order that the selected reference surface faces the window glass 286, the reference roll rotating motor 22 is driven, and thus positioning is executed.

In the next Step 404, it is determined whether or not the positioning has been completed, and when it is determined that the positioning has been completed, the procedure proceeds to Step 406. Then, an image reading start instruction is output, and the procedure proceeds to Step 408.

In Step 408, the image read processing is executed by the CCD sensor 204 of the built-in image sensor 200, and the procedure proceeds to Step 410 for one time of read processing.

In Step 410, it is determined whether or not the number of times of reading reaches N times (in the exemplary embodiment of the invention, 5 times), and when a determination result is negative, the procedure returns to Step 406, and the processes described above (the read processing) are repeated. In addition, when a determination result is positive in Step 410, it is determined that read processing of N times is ended, and the procedure proceeds to Step 412.

In Step 412, read information (for each RGB color component) of N times is added to acquire the added data, and then the procedure proceeds to Step 414, and thus a calculation for acquiring the differential data is executed based on the added data.

In the next Step 416, a calculation for acquiring the standardized data is executed based on the differential data, and the procedure proceeds to Step 418.

In Step 418, the standardized data is stored, and the procedure proceeds to Step 420. In Step 420, it is determined whether or not the standardized data of the entire reference surface has been stored, and when a determination result is negative, it is determined that there is a reference surface in which the standardized data is not stored. Then the procedure returns to Step 400, and the processes described above are repeated.

In addition, when a determination result is positive in Step 420, it is determined that the standardized data of the entire reference surface has been stored, and the procedure proceeds to Step 422 which is a starting point of dust detection processing.

In Step 422, a type of the dust to be detected (the white dust and the black dust) is selected, and then the procedure proceeds to Step 424. Then, a chromatic color reference surface of an analysis target is selected, and the procedure proceeds to Step 426.

In Step 426, the standardized data of the specified color component of the selected chromatic color reference surface is read out, and the procedure proceeds to Step 428.

In Step 428, the standardized data of a color component which is identical to the specified color component of the achromatic color reference surface for detecting a type of the selected dust (the white color or the black color) is read out, and the procedure proceeds to Step 430.

In Step 430, a collation of the standardized data is executed, and then in Step 432, it is determined whether or not the dust is detected by a result of the collation of the standardized data.

When a determination result is positive in Step 432, the procedure proceeds to Step 434, and the detected location of the dust (on the reference surface or on a surface of the window glass) is discriminated. Then the procedure proceeds to Step 436, the dust information is notified (for example, a message is displayed), and the procedure proceeds to Step 438. In Step 438, the calibration processing is executed based on the attached dust, and the procedure proceeds to Step 440.

The message to be notified to the user is displayed on the display surface of the UI panel 30, and for example, a message such as a message of "The white dust is attached to an area s around the coordinates (x, y) of the window glass.", or a message of "The black dust is attached to an area s around the coordinates (x, y) of the white color reference surface." is displayed. The message is not limited to about coordinates, and may be an unclear expression such as "on a diagonal line" or "an upper left corner portion".

In addition, when a determination result is negative in Step 432, it is determined that the dust is not detected, and the procedure proceeds to Step 440.

In Step 440, it is determined whether or not to continue the processing. When a determination result is positive in Step 440, the procedure returns to Step 432, and the processes described above are repeated.

The continuation of the processing includes both a change in a type of the dust on the same reference surface and a change of the reference surface into a different reference surface. For example, the yellow color reference surface 234 is selected first, and the execution of white dust detection processing is ended, and in succession, black dust detection processing on the same yellow color reference surface 234 is executed.

In addition, the yellow color reference surface 234 is selected, and the executions of the white dust detection processing and the black dust detection processing are ended, and in succession, the white dust detection processing or the black dust detection processing of the reference surface of the next color (for example, the blue color reference surface 235) is executed.

On the other hand, when a determination result is negative in Step 440, it is determined that the entire processing is ended, and the routine is ended.

EXAMPLE

Hereinafter, by taking the yellow color reference surface 234 as an example, control (mainly Step 426 to Step 438) from the collation of the standardized data and the dust detection to the notification in the dust specifying control according to the flowcharts in FIGS. 6A and 6B will be described more specifically and in a more detailed order.

Example 1

White Dust Detection by Yellow Color Reference Surface 234 and Detection Reference Surface 228 (Black Color)

FIG. 7 is a flowchart illustrating white dust detection by the yellow color reference surface 234 and the detection reference surface 228 (a black color), and a calibration execution control routine.

In Step 450W of FIG. 7, the standardized data Yb of the blue color component of the yellow color reference surface 234 is read out, and then the procedure proceeds to Step 452W. Then, the standardized data Kb of the blue color component of the detection reference surface 228 (a black color) is read out, and the procedure proceeds to Step 454W.

In Step 454W, as an analysis result of the standardized data Yb, it is determined whether or not there is a determination of "existence of dust".

When a determination result is positive in Step 454W, the procedure proceeds to Step 456W, and when a determination result is negative, the procedure proceeds to Step 458W. In each of Steps 456W and 458W, as an analysis result of the standardized data Kb, it is determined whether or not there is a determination of "existence of dust".

Here, when a determination result is positive in Step 454W, and when a determination result is positive in Step 456W, the procedure proceeds to Step 460W, and it is determined whether or not positions of the dust of the standardized data Yb and the standardized data Kb are coincident with each other.

The determination results in Steps 454W, 456W, 458W, and 460W described above are divided into 5 types of the following Determination Results 1 to 4 (Steps 462W, 464W, 466W, and 468W), and a normal determination.

Determination Result 1 Since the dust is detected not by the standardized data Yb but by the standardized data Kb, it is determined that the white dust is attached to the detection reference surface 228 (a black color) (Step 454W→Step 458W→Step 462W).

Determination Result 2

Since the dust is detected by both the standardized data Yb and the standardized data Kb, and the positions of the dust of both the standardized data Yb and the standardized data Kb are coincident with each other, it is determined that the white dust is attached to the surface of the window glass 286 (Step 454W→Step 456W→Step 460W→Step 464W).

Determination Result 3

Although the dust is detected by both the standardized data Yb and the standardized data Kb, the positions of the dust of both the standardized data Yb and the standardized data Kb are not coincident with each other, and thus it is determined that the white dust is attached to both the yellow color reference surface 234 and the detection reference surface 228 (a black color) (Step 454W→Step 456W→Step 460W→Step 466W).

Determination Result 4

Since the dust is detected not by the standardized data Kb but by the standardized data Yb, it is determined that the white dust is attached to the yellow color reference surface 234 (Step 454W→Step 456W→Step 468W).

Furthermore, when the dust is not detected by both the standardized data Yb and the standardized data Kb, obviously, it is determined as a normal determination (no dust) (Step 454W→Step 458W→Step 480W).

When the determinations (Steps 462W, 464W, 466W, and 468W) are ended, each procedure proceeds to Step 470W. In addition, when it is determined as the normal determination, the procedure proceeds from Step 458W to Step 480W.

In Step 470W, a position and a size of the dust (the white dust) attached to the image are calculated, and then the procedure proceeds to Step 472W, and it is determined whether or not the calibration processing is possible. For example, when it is determined that the dust does not affect the calibration, or an influence of the dust is less than or equal to a predetermined degree, it is determined that the calibration processing is possible, and the procedure proceeds to Step 474W.

In addition, when a determination result is negative in Step 472W, that is, when it is determined that the calibration processing is not possible, the procedure proceeds to Step 476W, and information related to the determination and a message for urging dust removal are displayed, and then the routine is ended.

In Step 474W, an overlapping state of the test chart which is designed for calculating a correction amount of an image forming condition of an image forming section and is printed from the image forming section, and the dust is displayed, and then the procedure proceeds to Step 478W, and the instruction of whether or not the calibration processing is possible is waited.

When there is the instruction that the calibration processing is possible in Step 478W, the procedure proceeds to Step 480W, and the calibration processing is executed, and then the routine is ended. In addition, when there is the instruction that the calibration processing is not possible in the Step 478W, the calibration processing is not executed, and the routine is ended.

Verification of Determination Result

FIGS. 8A and 8B are standardized data characteristic diagrams when the white dust is attached to the yellow color reference surface 234. FIG. 8A illustrates a flow in which the standardized data Yb is created from a read signal of a component B of the yellow color reference surface 234, and FIG. 8B illustrates a flow in which the standardized data Yb is created from a read signal of a component B of the detection reference surface 228 (a black color).

A characteristic diagram on an upper row of FIG. 8A is a result which is obtained by adding the read data of five times of the yellow color reference surface 234, and it is understood that noise A occurs remarkably in the vicinity of the pixel number 50.

A characteristic diagram on a middle row of FIG. 8A is differential data, and it is understood that there is an output difference in the noise A to such an extent as to be particularly notable with respect to a read signal of an adjacent pixel.

A characteristic diagram on a lower row of FIG. 8A is standardized data obtained from the differential data, and it is determined that the noise A occurs due to the dust.

Next, a characteristic diagram on an upper row of FIG. 8B is a result which is obtained by adding read data of five times of the detection reference surface 228 (a black color), and it is understood that remarkable noise does not occur in an entire range including the vicinity of the pixel number 50.

A characteristic diagram on a middle row of FIG. 8B is differential data, and it is understood that there is no output difference to such an extent as to be particularly notable with respect to a read signal of an adjacent pixel.

A characteristic diagram on a lower row of FIG. 8B is standardized data obtained from the differential data, and it is determined that there is no dust.

From the results of FIG. 8A and FIG. 8B, it is determined that the white dust is attached to the yellow color reference surface 234 (Determination Result 4 of FIG. 7).

Next, FIGS. 9A and 9B are standardized data characteristic diagrams when the white dust is attached to the window glass 286. FIG. 9A illustrates a flow in which the standardized data Yb is created from the read signal of the component B of the yellow color reference surface 234, and FIG. 9B illustrates a flow in which the standardized data Yb is created from the read signal of the component B of the detection reference surface 228 (a black color).

A characteristic diagram on an upper row of FIG. 9A is a result which is obtained by adding read data of five times of the yellow color reference surface 234, and it is understood that noise B occurs remarkably in the vicinity of the pixel number 50.

A characteristic diagram on a middle row of FIG. 9A is differential data, and it is understood that there is an output difference in the noise B to such an extent as to be particularly notable with respect to a read signal of an adjacent pixel.

A characteristic diagram on a lower row of FIG. 9A is standardized data obtained from the differential data, and it is determined that the noise B occurs due to the dust.

Next, a characteristic diagram on an upper row of FIG. 9B is a result which is obtained by adding read data of five times of the detection reference surface 228 (a black color), and it is understood that noise B' occurs remarkably in the vicinity of the pixel number 50.

A characteristic diagram on a middle row of FIG. 9B is differential data, and it is understood that there is an output difference in the noise B' to such an extent as to be particularly notable with respect to a read signal of an adjacent pixel.

A characteristic diagram on a lower row of FIG. 9B is standardized data obtained from the differential data, and it is determined that the noise B' occurs due to the dust.

From the results of FIG. 9A and FIG. 9B, there are the noise B and the noise B' on the same position (in the vicinity of the pixel number 50), and thus it is difficult to consider that the white dust is attached to both the yellow color reference surface 234 and the detection reference surface 228 (a black color), and it is appropriate to presume that the noise B and the noise B' occur due to the same dust. As a result, it is determined that the white dust is attached to the window glass 286 (that is, on the optical path) (Determination Result 2 of FIG. 7).

Example 2

Black Dust Detection by Yellow Color Reference Surface 234 and White Color Reference Surface 232

FIG. 10 is a flowchart illustrating black dust detection routine by the yellow color reference surface 234 and the white color reference surface 232, and a calibration processing execution control routine.

In Step 450K of FIG. 10, the standardized data Yr of the red color component of the yellow color reference surface 234 is read out, and then the procedure proceeds to Step 452K. Then, the standardized data Wr of the red color component of the white color reference surface 232 is read out, and the procedure proceeds to Step 454K.

In Step 454K, as an analysis result of the standardized data Yr, it is determined whether or not there is a determination of "existence of dust".

When a determination result is positive in Step 454K, the procedure proceeds to Step 456K, and when a determination result is negative, the procedure proceeds to Step 458K. In each of Steps 456K and 458K, as an analysis result of the standardized data Wr, it is determined whether or not there is a determination of "existence of dust".

Here, when a determination result is positive in Step 454K, and a determination result is positive in Step 456K, the procedure proceeds to Step 460K, and it is determined whether or not positions of the dust of the standardized data Yr and the standardized data Wr are coincident with each other.

The determination results in Steps 454K, 456K, 458K, and 460K described above are divided into 5 types of the following Determination Results 1 to 4 (Steps 462K, 464K, 466K, and 468K), and a normal determination.

Determination Result 1

Since the dust is detected not by the standardized data Yr but by the standardized data Wr, it is determined that the black dust is attached to the white color reference surface 232 (Step 454K→Step 458K→Step 462K).

Determination Result 2

Since the dust is detected by both the standardized data Yr and the standardized data Wr, and the positions of the dust of both the standardized data Yr and the standardized data Wr are coincident with each other, it is determined that the black dust is attached to the surface of the window glass 286 (Step 454K→Step 456K→Step 460K→Step 464K).

Determination Result 3

Although the dust is detected by both the standardized data Yr and the standardized data Wr, the positions of the dust of both the standardized data Yr and the standardized data Wr are not coincident with each other, and thus it is determined that the black dust is attached to both the yellow color reference surface 234 and the white color reference surface 232 (Step 454K→Step 456K→Step 460K→Step 466K).

Determination Result 4

Since the dust is detected not by the standardized data Wr but by the standardized data Yr, it is determined that the black dust is attached to the yellow color reference surface 234 (Step 454K→Step 456K→Step 468K).

Furthermore, when the dust is not detected by both the standardized data Yr and the standardized data Wr, obviously, it is determined as a normal determination (no dust) (Step 454K→Step 458K→Step 480K).

When the determinations (Steps 462K, 464K, 466K, and 468K) are ended, each procedure proceeds to Step 470K. In addition, when it is determined as the normal determination, the procedure proceeds from Step 458K to Step 480K.

In Step 470K, a position and a size of the dust (the black dust) attached to the image are calculated, and then the procedure proceeds to Step 472K, and it is determined whether or not the calibration processing is possible. For example, when it is determined that the dust does not affect the calibration, or an influence of the dust is less than or equal to a predetermined degree, it is determined that the calibration processing is possible, and the procedure proceeds to Step 474K.

In addition, when a determination result is negative in Step 472K, that is, when it is determined that the calibration processing is not possible, the procedure proceeds to Step 476K, and information related to the determination and a message for urging dust removal are displayed, and then the routine is ended.

In Step 474K, an overlapping state of the test chart and the dust is displayed, and then the procedure proceeds to Step 478K, and the instruction of whether or not the calibration processing is possible is waited.

When there is the instruction that the calibration processing is possible in Step 478K, the procedure proceeds to Step 480K, and the calibration processing is executed, and then the routine is ended. In addition, when there is the instruction that the calibration processing is not possible in the Step 478K, the calibration processing is not executed, and the routine is ended.

FIG. 11 is a chart illustrating a correspondence between Determination Results 1 to 4 of FIG. 7 and Determination Results 1 to 4 of FIG. 10 based on an analysis of the standardized data Yb and Kb, and the standardized data Yr and Wr. According to the exemplary embodiment of the invention, the existence or non-existence of the dust attached to the reference surface of the chromatic color is able to be reliably discriminated.

Example 3

Color Component Most Suitable for Reference Surfaces of Each Color and Black Dust Detection, and Color Component Most Suitable for White Dust Detection Table 1 collectively shows the color components for discriminating the existence or non-existence of the dust (the black dust and the white dust) in the reference surfaces of each color (the yellow color reference surface 234, the cyan color reference surface 237, the magenta color reference surface 239, the red color reference surface 231, the green color reference surface 233, and the blue color reference surface 235) or the position thereof which are applied to the exemplary embodiment of the invention.

In all the color reference surfaces, when the black dust is discriminated, the color component which is the complementary color is selected, and when the white dust is discriminated, the color component which is not the complementary color is selected.

TABLE 1

| Reference surface | Black dust discrimination | White dust discrimination |
|---|---|---|
| Y (yellow) | B color component | R color or G color component |
| C (cyan) | R color component | G color or B color component |
| M (magenta) | G color component | R color or B color component |
| R (red) | C color component | M color or Y color component |
| G (green) | M color component | C color or Y color component |
| B (blue) | Y color component | C color or M color component |

M color component indicates composite data of R color + B color
Y color component indicates composite data of R color + G color
C color component indicates composite data of G color + B color By using a color component selection list shown in Example 3, even in the color reference surfaces (the cyan color reference surface 237, the magenta color reference surface 239, the red color reference surface 231, the green color reference surface 233, and the blue color reference surface 235) other than the yellow color reference surface 234 shown in Example 1 and Example 2, the existence or non-existence of the dust which is divided into the white dust and the black dust, and the position thereof when the dust exists are able to be reliably discriminated.

Furthermore, in the exemplary embodiment described above, an aspect in which the white color reference surface is used as the color reference surface of the achromatic color is described as an example, but the exemplary embodiment of the invention is not limited thereto. For example, an aspect in which a black color reference surface, a grey color reference surface, and the like are used may be included. In addition, an aspect in which the yellow color reference surface, the magenta color reference surface, the cyan color reference surface, the red color reference surface, the green color reference surface, and the blue color reference surface are used as the color reference surface of the chromatic color is described as an example, but the exemplary embodiment of the invention is not limited thereto. In view of accuracy of the required color gamut correction or the like, an aspect in which one or plural other color reference surfaces is added may be included.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading apparatus, comprising:
an update unit that updates a color correction coefficient of an image read signal of an image read by a reading unit using a color reference surface provided with an achromatic color reference surface and a chromatic color reference surface;
a first detection unit that detects existence of dust based on read information of the achromatic color reference surface;
a second detection unit that detects existence of the dust based on the read information of the chromatic color reference surface; and
a third detection unit that detects a type of an optical component onto which the dust is attached according to a detection result of the first detection unit and the second detection unit.

2. The image reading apparatus according to claim 1, wherein the third detection unit compares the read information of a portion having a relatively low reflection ratio on the achromatic color reference surface with the read information of a color component which is complementary to a color of the chromatic color reference surface in the read information in which the chromatic color reference surface is subjected to color separation, and detects an attached position of the dust having a relatively high reflection ratio and the type of the optical component onto which the dust is attached.

3. The image reading apparatus according to claim 1, wherein the third detection unit compares the read information of a portion having a relatively high reflection ratio on the achromatic color reference surface with the read information of a color component which is not complementary to a color of the chromatic color reference surface in the read information in which the chromatic color reference surface is subjected to color separation, and detects a position onto which the dust having a relatively low reflection ratio is attached and the type of the optical component onto which the dust is attached.

4. The image reading apparatus according to claim 2, wherein the third detection unit compares the read information of a portion having a relatively high reflection ratio on the achromatic color reference surface with the read information of a color component which is not complementary to a color of the chromatic color reference surface in the read information in which the chromatic color reference surface is subjected to color separation, and detects a position onto which the dust having a relatively low reflection ratio is attached and the type of the optical component onto which the dust is attached.

5. The image reading apparatus according to claim 2, wherein when the dust exists in a same position in the detection result of the first detection unit and the second detection unit, the third detection unit detects a position by determining that the dust exists on the optical component which is positioned on an optical path other than the color reference surface, and when the dust exists in a different position, the third detection unit detects a position by determining that the dust exists in at least one of the achromatic color reference surface and the chromatic color reference surface.

6. The image reading apparatus according to claim 3, wherein when the dust exists in a same position in the detection result of the first detection unit and the second detection unit, the third detection unit detects a position by determining that the dust exists on the optical component which is positioned on an optical path other than the color reference surface, and when the dust exists in a different position, the third detection unit detects a position by determining that the dust exists in at least one of the achromatic color reference surface and the chromatic color reference surface.

7. The image reading apparatus according to claim 4, wherein when the dust exists in a same position in the detection result of the first detection unit and the second detection unit, the third detection unit detects a position by determining that the dust exists on the optical component which is positioned on an optical path other than the color reference surface, and when the dust exists in a different position, the third detection unit detects a position by determining that the dust exists in at least one of the achromatic color reference surface and the chromatic color reference surface.

8. The image reading apparatus according to claim 1, wherein the first detection unit and the second detection unit obtain differential information with respect to an adjacent pixel based on the image read signal, and detect the existence of the dust by comparing a standard deviation of the differential information with a predetermined value.

9. The image reading apparatus according to claim 2, wherein the first detection unit and the second detection unit obtain differential information with respect to an adjacent pixel based on the image read signal, and detect the existence of the dust by comparing a standard deviation of the differential information with a predetermined value.

10. The image reading apparatus according to claim 3, wherein the first detection unit and the second detection unit obtain differential information with respect to an adjacent pixel based on the image read signal, and detect the existence of the dust by comparing a standard deviation of the differential information with a predetermined value.

11. The image reading apparatus according to claim 4, wherein the first detection unit and the second detection unit obtain differential information with respect to an adjacent pixel based on the image read signal, and detect the existence of the dust by comparing a standard deviation of the differential information with a predetermined value.

12. The image reading apparatus according to claim 5, wherein the first detection unit and the second detection unit obtain differential information with respect to an adjacent pixel based on the image read signal, and detect the existence of the dust by comparing a standard deviation of the differential information with a predetermined value.

13. The image reading apparatus according to claim 6, wherein the first detection unit and the second detection unit obtain differential information with respect to an adjacent pixel based on the image read signal, and detect the existence of the dust by comparing a standard deviation of the differential information with a predetermined value.

14. The image reading apparatus according to claim 7, wherein the first detection unit and the second detection unit obtain differential information with respect to an adjacent pixel based on the image read signal, and detect the existence of the dust by comparing a standard deviation of the differential information with a predetermined value.

15. The image reading apparatus according to claim 1, wherein the first detection unit and the second detection unit obtain differential information with respect to an adjacent pixel based on a total signal of image read signals of a plurality of times, and detect the existence of the dust by comparing a standard deviation of the differential information with a predetermined value.

16. The image reading apparatus according to claim 2, wherein the first detection unit and the second detection unit obtain differential information with respect to an adjacent pixel based on a total signal of image read signals of a plurality of times, and detect the existence of the dust by comparing a standard deviation of the differential information with a predetermined value.

17. The image reading apparatus according to claim 1, further comprising:
a first notification unit that notifies a user of whether or not to update the color correction coefficient when the third detection unit detects the existence of the dust.

18. The image reading apparatus according to claim 1, further comprising:
a second notification unit that notifies a user of a cleaning position, a size of the dust, a type of black dust and white dust when the third detection unit detects the existence of the dust.

19. The image reading apparatus according to claim 1, further comprising:

a comparing stage which compares a position of the dust with a reading position of the image stored in advance when the third detection unit detects the existence of the dust.

20. An image forming apparatus to which the image reading apparatus according to claim 1 is applied in order to create a correction coefficient for calibration during forming an image by an image forming unit.

* * * * *